US012637975B2

(12) United States Patent
Nath et al.

(10) Patent No.: US 12,637,975 B2
(45) Date of Patent: May 26, 2026

(54) COOLING FLUID CONTROL SYSTEM AND METHODS OF OPERATING A COOLING FLUID SYSTEM FOR A TURBINE ENGINE

(71) Applicant: General Electric Company, Schenectady, NY (US)

(72) Inventors: Hiranya Nath, Bengaluru (IN); Ravindra Shankar Ganiger, Bengaluru (IN); Hejie Li, Mason, OH (US); Habeeb Kunnummal Manat, Bengaluru (IN); Nicholas R. Overman, Sharonville, OH (US); Steven C. Vise, Loveland, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 9 days.

(21) Appl. No.: 18/429,914

(22) Filed: Feb. 1, 2024

(65) Prior Publication Data

US 2025/0250937 A1 Aug. 7, 2025

(51) Int. Cl.
*F02C 7/16* (2006.01)
*F02C 9/28* (2006.01)
*F23R 3/00* (2006.01)

(52) U.S. Cl.
CPC .................. *F02C 7/16* (2013.01); *F02C 9/28* (2013.01); *F23R 3/002* (2013.01)

(58) Field of Classification Search
CPC .................................... F02C 3/30; F23R 3/283
See application file for complete search history.

(56) References Cited

U.S. PATENT DOCUMENTS

| | | | |
|---|---|---|---|
| 5,584,182 | A | 12/1996 | Althaus et al. |
| 6,983,605 | B1 | 1/2006 | Hook et al. |
| 7,665,308 | B2 | 2/2010 | Durbin et al. |
| 9,835,089 | B2 | 12/2017 | Zuo et al. |
| 10,161,312 | B2 | 12/2018 | Huntington et al. |
| 10,227,922 | B2 | 3/2019 | Whelan |
| 10,480,792 | B2 | 11/2019 | Slobodyanskiy et al. |
| 10,900,420 | B2 | 1/2021 | White |
| 2002/0023423 | A1* | 2/2002 | Viteri .......................... F02C 6/18 60/39.182 |
| 2009/0180939 | A1* | 7/2009 | Hagen ....................... F23R 3/28 422/600 |

(Continued)

FOREIGN PATENT DOCUMENTS

WO 201471166 A3 5/2014

*Primary Examiner* — Scott J Walthour
(74) *Attorney, Agent, or Firm* — Venable LLP; Peter T. Hrubiec; Michele V. Frank

(57) ABSTRACT

A cooling fluid control system for a turbine engine having one or more fuel nozzles. The cooling fluid control system includes a cooling fluid system and a controller. The cooling fluid system is in fluid communication with the one or more fuel nozzles for supplying a cooling fluid to the one or more fuel nozzles. The controller controls the cooling fluid system to supply the cooling fluid through the one or more fuel nozzles when the turbine engine is shut down. In one aspect, the controller controls the cooling fluid system to supply the cooling fluid through the one or more fuel nozzles when a fuel nozzle temperature of the one or more fuel nozzles is greater than a fuel nozzle temperature threshold during at least one of a mid-level power operation or a low power operation of the turbine engine.

20 Claims, 8 Drawing Sheets

(56)             References Cited

U.S. PATENT DOCUMENTS

| | | | |
|---|---|---|---|
| 2013/0055698 A1* | 3/2013 | Fletcher | F02C 3/30 |
| | | | 60/39.55 |
| 2014/0123672 A1* | 5/2014 | Huntington | F02C 3/34 |
| | | | 60/39.23 |
| 2022/0213837 A1* | 7/2022 | Berger | F02C 3/30 |

* cited by examiner

COOLING FLUID CONTROL SYSTEM AND METHODS OF OPERATING A COOLING FLUID SYSTEM FOR A TURBINE ENGINE

TECHNICAL FIELD

The present disclosure relates generally to a cooling fluid control system and methods of operating a cooling fluid system for turbine engines, particularly, in turbine engines for aircraft.

BACKGROUND

Turbine engines generally includes a fan and a turbo-engine arranged in flow communication with one another. A combustor is arranged in the turbo-engine to generate combustion gases for driving a turbine of the turbine engine.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
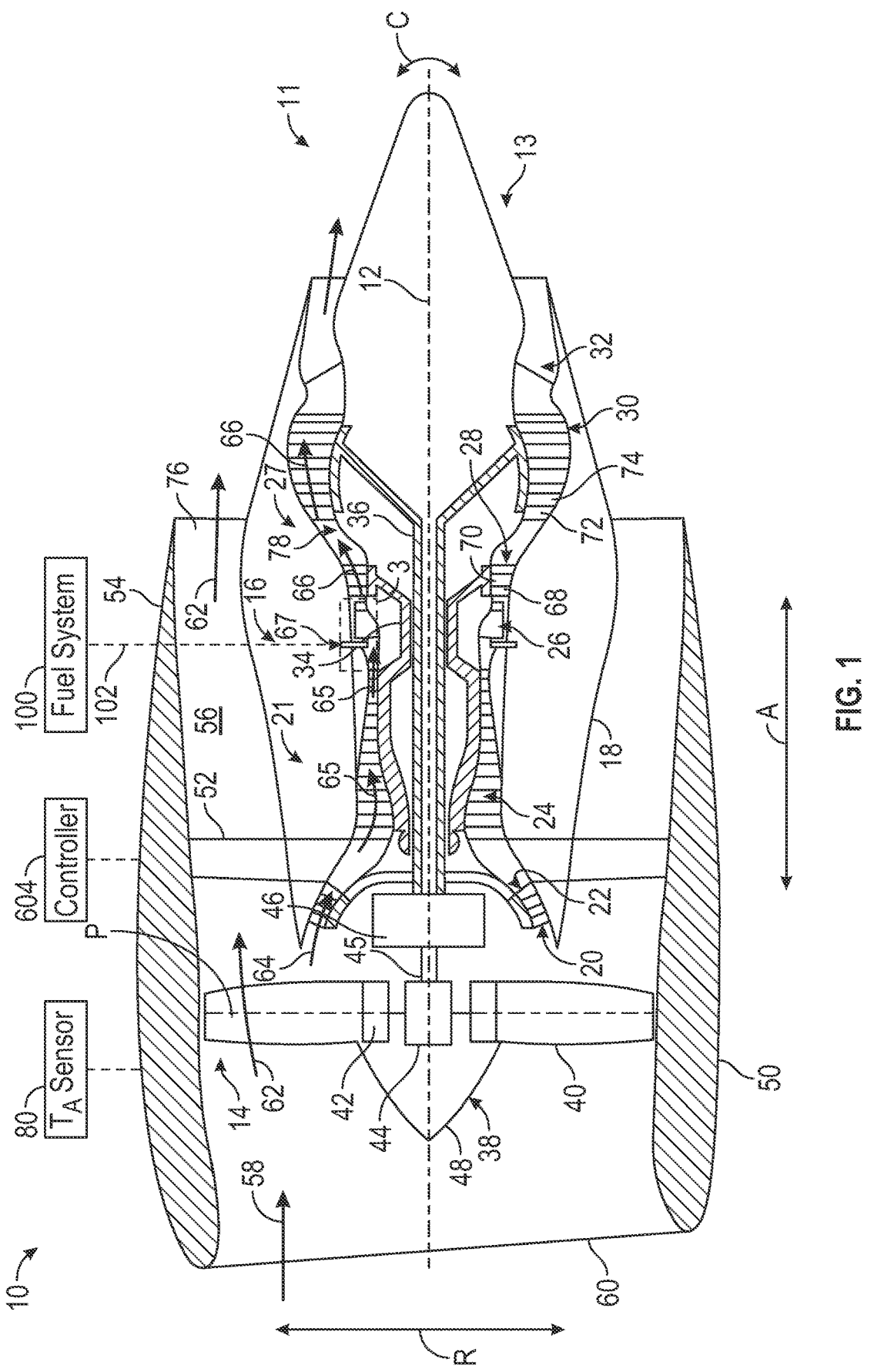
FIG. 1 is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a high-bypass turbine engine, forward refers to a position closer to an engine inlet and aft refers to a position closer to an engine nozzle or exhaust. In one example, in a reverse flow turbine engine, forward refers to a position closer to the engine nozzle or exhaust and aft refers to a position closer to an engine inlet.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low power" setting defines the engine configured to operate at a power output lower than a "high power" setting of the engine, and a "mid-level power" setting defines the engine configured to operate at a power output higher than a "low power" setting and lower than a "high power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine are defined as a percentage of a sea level static (SLS) maximum engine rated thrust. Low power operation includes, for example, less than or equal to thirty percent (30%) of the SLS maximum engine rated thrust of the turbine engine. Mid-level power operation includes, for example, greater than thirty percent (30%) to less than eighty-five percent (85%) of the SLS maximum engine rated thrust of the turbine engine. High power operation includes, for example, greater than or equal to eighty-five percent (85%) of the SLS maximum engine rated thrust of the turbine engine.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components or the systems or manufacturing the components or the systems. For example, the approximating language may refer to being within a one, a two, a four, a ten, a fifteen, or a twenty percent margin in either individual values, range(s) of values or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

Combustors for turbine engines, such as turbine engines for aircraft, ignite fuel and air mixtures to produce combustion gases, which, in turn, drive one or more turbines of the turbine engine, thereby rotating one or more loads (e.g., a fan, a propeller, etc.). Air pollution concerns have led to stricter combustion emissions standards. Such standards regulate the emission of nitrogen oxide ($NO_x$), as well as other types of exhaust emissions, from the turbine engine. Generally, $NO_x$ is formed during the combustion process due to high flame temperatures in the combustor. In turbine engine design, balancing a reduction in $NO_x$ emissions, while achieving improved engine performance, is difficult. For example, combustor design changes to achieve lower emissions must not impact the ability of the combustion system to satisfy performance and certification requirements throughout the operating cycle of the aircraft.

In addition to balancing a reduction in emissions while achieving improved engine performance, another tradeoff is reducing the specific fuel consumption (SFC) of the turbine engine. The specific fuel consumption is the amount of fuel consumed by the turbine engine for each unit of power output. Accordingly, a lower SFC means that less fuel is consumed to achieve a particular power output of the turbine engine. The lower SFC, however, demands higher thermal efficiency of the engine. Thus, operating pressures and temperatures of the turbine engine are significantly increased to achieve the lower SFC. The increased temperatures in the combustor can heat up the fuel nozzles. This causes a fuel temperature of the fuel in the fuel nozzles to increase above a temperature threshold (e.g., 350° F.) and the fuel can begin to cook within the fuel nozzles and the fuel system valves and carbonaceous deposits (also known as coke) may form in the fuel. This process is also known as coking and the coke can block the fuel circuits in the fuel nozzles, thereby reducing the durability and the thermal efficiency of the turbine engine. During some operating conditions, such as during mid-level power operation of the turbine engine (e.g., cruise, descent, or approach), there is less fuel injected through the fuel nozzles (as compared to high power operation), and, therefore, there is less fuel to absorb heat from the fuel nozzle surfaces to cool the fuel nozzle surfaces. Thus, the risk of coking increases during such operating conditions. Some turbine engines utilize coke barrier coatings in the fuel nozzles or utilize fuel additives to prevent coking. The coke barrier coatings, however, are difficult to implement on metal surfaces of the fuel nozzles. The fuel additives alter the chemistry of the fuel coking reactions, and may alter the chemistry of other aspects of the fuel as well. Further, adding fuel additives to the fuel is not a preferred approach considering aircraft operational aspects as fuel additives require additional cost and processes on fuel producers or on airliners to add the fuel additives.

Further, when the turbine engine is shut down after operation, hot air (e.g., 500° F. to 1250° F.) in the combustion chamber continues to heat the fuel nozzles before the heat dissipates. This process is known as soak-back heating. In particular, the hot air rises and a temperature of the fuel nozzles in a top portion of the combustor rises due to natural convection heating from the hot air. Thus, the temperature of the fuel in the fuel nozzles can increase above the temperature threshold at soak-back temperatures and the coke can form in the fuel even after the turbine engine is shut down. Some turbine engines utilize a blower (e.g., a fan) that blows cooling air through the combustor during a shutdown to cool the fuel nozzles to prevent soak-back coking. Such blowers, however, increase a weight of the turbine engine, thereby reducing propulsive efficiency.

Accordingly, the present disclosure provides for a cooling fluid system and systems and methods of operating the cooling fluid system. The cooling fluid system supplies a cooling fluid (e.g., water or steam) through one or more fuel nozzles and injects the cooling fluid into the combustion chamber. In one embodiment, the cooling fluid is extracted from exhaust gas of the turbine engine. The fuel nozzles include an integrated cooling fluid circuit to reduce a fuel nozzle temperature of the fuel nozzles (e.g., a temperature of the surfaces of the fuel nozzles) and a fuel temperature of the fuel within the fuel nozzles. The cooling fluid system supplies the cooling fluid through the fuel nozzles to reduce coking in the fuel during operation of the turbine engine. The used cooling fluid can be collected and recycled back through the cooling fluid system. In some embodiments, the cooling fluid system supplies the cooling fluid through the fuel nozzles after the turbine engine is shut down to reduce the risk of soak-back fuel coking.

The systems and methods of the present disclosure use turbine engine operating parameters or ambient conditions to turn the cooling fluid system on or off. In some embodiments, the systems and methods of operating the cooling fluid system include supplying the cooling fluid through the fuel nozzles during a flight cycle of the turbine engine (e.g., while the turbine engine is operating). For example, the systems and methods operate the cooling fluid system to inject the cooling fluid through the fuel nozzles during high power operation (e.g., takeoff or climb) mid-level power operation (e.g., cruise), or during low power operation (e.g., descent and approach) based on turbine engine operating parameter thresholds.

The various power levels of the turbine engine are defined as a percentage of a sea level static (SLS) maximum engine rated thrust. Low power operation includes, for example, less than or equal to thirty percent (30%) of the SLS maximum engine rated thrust of the turbine engine. Mid-level power operation includes, for example, greater than thirty percent (30%) to less than eighty-five percent (85%) of the SLS maximum engine rated thrust of the turbine engine. High power operation includes, for example, greater than or equal to eighty-five percent (85%) of the SLS maximum engine rated thrust of the turbine engine. The values of the thrust for each of the low power operation, the mid-level power operation, and the high power operation of the turbine engine are exemplary only, and other values of the thrust can be used to define the low power operation, the mid-level power operation, and the high power operation.

The systems and methods disclosed herein inject the cooling fluid through the fuel nozzles and into the combustion chamber at takeoff and climb power settings (e.g., high power operation) to reduce overall NO$_x$ emissions. The systems and methods operate the cooling fluid system to inject the cooling fluid at cruise power settings (e.g., mid-level power operation) and at descent and approach power settings (e.g., low power operation) only when the fuel nozzle temperature is greater than a fuel nozzle temperature threshold (e.g., 350° F.). Thus, the systems and methods shut off the cooling fluid injection through the fuel nozzles at the cruise power settings (e.g., mid-level power operation) and, at the descent and approach power settings (e.g., low power operation), when the fuel nozzle temperature is less than or equal to the fuel nozzle temperature threshold.

The cooling fluid injection reduces NO$_x$ emissions when the cooling fluid system is supplying the cooling fluid into the combustion chamber during operation. The cooling fluid injection during the mid-level power operation and the low power operation only when the fuel nozzle temperature is greater than the fuel nozzle temperature threshold helps to avoid coking in the fuel while also ensuring engine performance is not sacrificed during such operations. The cooling fluid (e.g., liquid) can be stored aboard the turbine engine or the aircraft. For example, a water tank aboard can store the water. The water can be recycled, captured in exhaust, or from the environment (e.g., metal organics) on the climb and descent legs of the mission cycle. Engine waste heat and/or heated fuel can be used to convert the water to steam for steam injection.

The systems and methods also operate the cooling fluid system to supply the cooling fluid through the fuel nozzles after the turbine engine is shut down and when the ambient air temperature is greater than an ambient air temperature threshold. The cooling fluid system circulates the cooling fluid (e.g., in liquid form) through the fuel nozzles and into the combustion chamber. The cooling fluid collects on a bottom of the combustion chamber and the cooling fluid system pumps the cooling fluid from the combustion chamber to recycle the cooling fluid back to a cooling fluid tank of the cooling fluid system to circulate the cooling fluid through the cooling fluid system again. Thus, the cooling fluid system is a closed system. Thus, the systems and methods provide for preventing the fuel from exceeding a fuel coking temperature threshold to prevent soak-back coking of the fuel during the shutdown of the turbine engine.

Accordingly, the cooling fluid injection provides lower emissions during the high power operation (e.g., higher temperatures) to suppress NO$_x$ emissions, while also preventing fuel coking in the fuel nozzles during operation of the turbine engine. The embodiments of the present disclosure also provide for preventing fuel soak-back coking when the turbine engine is shutdown. Thus, the systems and methods herein provide for preventing fuel coking in the fuel nozzles without adding weight to the turbine engine (e.g., without using a blower to cool the hot air), without using fuel additives, and without having to use coke barrier coatings.

Referring now to the drawings, FIG. 1 is a schematic cross-sectional diagram of a turbine engine 10, taken along a longitudinal centerline axis 12 of the turbine engine 10, according to an embodiment of the present disclosure. As shown in FIG. 1, the turbine engine 10 defines an axial direction A extending parallel to the longitudinal centerline axis 12, a radial direction R that is normal to the axial direction A, and a circumferential direction C that extends arcuately about the longitudinal centerline axis 12. In the orientation of FIG. 1, portions of the turbine engine 10 above the longitudinal centerline axis 12 are referred to as a top portion 11 and portions of the turbine engine 10 below the longitudinal centerline axis 12 are referred to as a bottom portion 13.

In general, the turbine engine 10 includes a fan section 14 and a turbo-engine 16 disposed downstream from the fan section 14. The turbo-engine 16 includes, in serial flow relationship, a compressor section 21, a combustor 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustor 26 is downstream of the compressor section 21. The turbine section 27 is downstream of the combustor 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34, and a low-pressure (LP) shaft 36. The HP shaft 34 drivingly connects the HP turbine 28 to the HP compressor 24, and the HP compressor 24, the HP turbine 28, and the HP shaft 34 are together referred to as an HP spool. The HP turbine 28 and the HP compressor 24 rotate in unison through the HP shaft 34. The LP shaft 36 drivingly connects the LP turbine 30 to the LP compressor 22, and the LP compressor 22, the LP turbine 30, and the LP shaft 36 are together referred to as an LP spool. The LP turbine 30 and the LP compressor 22 rotate in unison through the LP shaft 36. The compressor section 21, the combustor 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuation member 44 configured to collectively vary the pitch of the fan blades 40 in unison. The fan blades 40, the disk 42, and the actuation member 44 are together rotatable about the longitudinal centerline axis 12 via a fan shaft 45 that is powered by the LP shaft 36 across a power gearbox, also referred to as a gearbox assembly 46 (e.g., the turbine engine 10 is an indirect drive engine). In this way, the fan 38 is drivingly coupled to, and powered by, the turbo-engine 16. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that are circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween.

During operation of the turbine engine 10, a volume of air 58 enters the turbine engine 10 through an inlet 60 of the nacelle 50 or the fan section 14. As the volume of air 58 passes across the fan blades 40, a first portion of air, also referred to as bypass air 62, is directed into the bypass airflow passage 56. At the same time, a second portion of air, also referred to as core air 64, is directed into the upstream section of the core air flow path through the core inlet 20 of the LP compressor 22. The ratio between the bypass air 62 and the core air 64 is commonly known as a bypass ratio. The pressure of the core air 64 is then increased through the LP compressor 22, generating compressed air 65. The compressed air 65 is directed through the HP compressor 24, where the pressure of the compressed air 65 is further increased. The compressed air 65 is then directed into the combustor 26, where the compressed air 65 is mixed with fuel 67 and ignited to generate combustion gases 66.

The combustion gases 66 are directed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 through the HP shaft 34 (self-sustaining cycle). In this way, the combustion gases 66 do work on the HP turbine 28. The combustion gases 66 are then directed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 through the LP shaft 36 via the gearbox assembly 46. In this way, the combustion gases 66 do work on the LP turbine 30.

The combustion gases 66 are subsequently directed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

As detailed above, the core air 64 (e.g., the compressed air 65) is mixed with the fuel 67 in the combustor 26 to produce the combustion gases 66. The turbine engine 10 also includes a fuel system 100 for providing the fuel 67 to the combustor 26. The fuel system 100 includes a fuel tank (not shown) for storing the fuel 67 therein and one or more fuel supply lines 102 to provide the fuel 67 to the combustor 26. The fuel system 100 can include one or more valves for controlling an amount of the fuel 67 provided to the combustor 26. The fuel 67 can be any type of fuel used for turbine engines including liquid fuel or gaseous fuel. For example, the fuel 67 can be JetA, sustainable aviation fuels (SAF) including biofuels, hydrogen-based fuel ($H_2$), or the like.

A controller 604 is in communication with the turbine engine 10 for controlling aspects of the turbine engine 10. For example, the controller 604 is in two-way communication with the turbine engine 10 for receiving signals from various sensors and control systems of the turbine engine 10 and for controlling components of the turbine engine 10, as detailed further below. The controller 604, or components thereof, may be located onboard the turbine engine 10, onboard the aircraft, or can be located remote from each of the turbine engine 10 and the aircraft. The controller 604 can be a Full Authority Digital Engine Control (FADEC) that controls aspects of the turbine engine 10.

The turbine engine 10 includes an ambient air temperature ($T_A$) sensor 80 that senses an ambient air temperature of air surrounding the turbine engine 10. The ambient air temperature sensor 80 can include any type of sensor or virtual sensor for sensing ambient air temperature and indicating values indicative of ambient air temperature. The ambient air temperature sensor 80 converts the sensed ambient air temperatures into electrical signals and sends the electrical signals to the controller 604, as detailed further below.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, turbojet engines, turboprop, or turboshaft engines.

Figure 2:
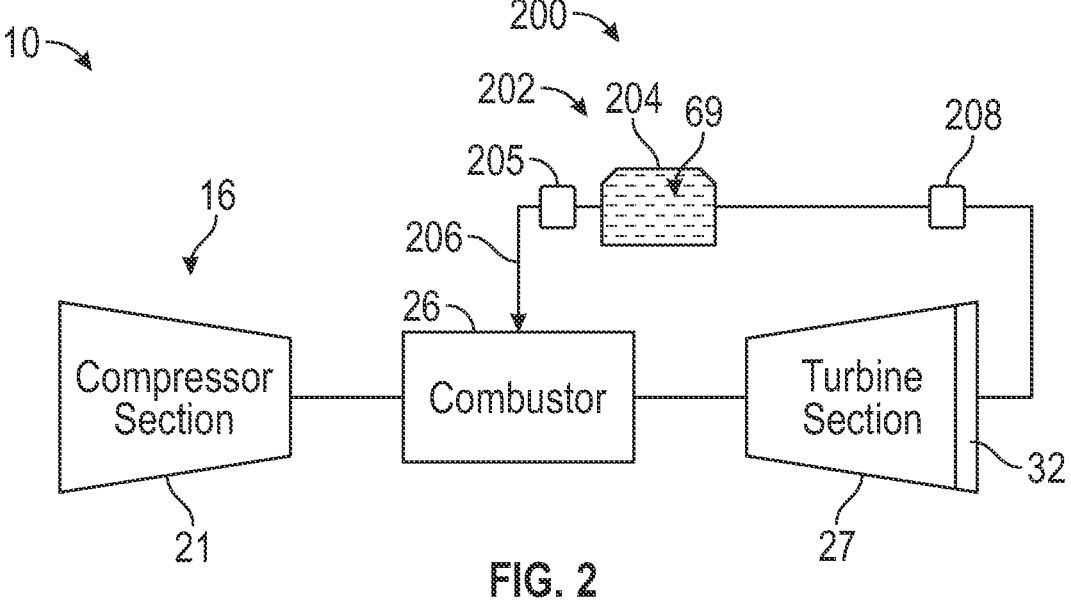
FIG. 2 is a schematic view of a turbo-engine and a cooling fluid system of the turbine engine of FIG. 1, according to the present disclosure.

FIG. 2 is a schematic view of the turbo-engine 16 and a cooling fluid system 200 of the turbine engine 10, according to the present disclosure. The cooling fluid system 200 extracts fluid (e.g., water) from the combustion gases 66 in the jet exhaust nozzle section 32. The cooling fluid system 200 is in fluid communication with the combustor 26 for supplying a cooling fluid 69 to the combustor 26, as detailed further below. The cooling fluid system 200 includes a cooling fluid supply 202 that includes a cooling fluid tank 204, a cooling fluid supply pump 205, and one or more cooling fluid supply lines 206. The cooling fluid tank 204 stores the cooling fluid 69 (as a liquid) therein. The cooling fluid system 200 also includes a condenser 208 that condenses the cooling fluid 69 (e.g., liquid water) from the combustion gases 66. The cooling fluid system 200 directs the cooling fluid 69 from the condenser 208 to the cooling fluid tank 204 for storing the cooling fluid 69 therein. In this way, the cooling fluid 69 is stored in the cooling fluid tank 204 onboard the aircraft or aboard the turbine engine 10 (FIG. 1).

The cooling fluid system 200 supplies the cooling fluid 69 from the cooling fluid supply 202 to the combustor 26 through the one or more cooling fluid supply lines 206. For example, the cooling fluid supply pump 205 pumps the cooling fluid 69 from the cooling fluid tank 204 through the one or more cooling fluid supply lines 206 and to the combustor 26. In some embodiments, waste heat and/or heated fuel is used to convert the liquid water to steam such that the cooling fluid 69 is steam. For example, the cooling fluid supply 202 can include a heat exchanger (e.g., a boiler) for heating the liquid water to generate the steam. In this way, the cooling fluid 69 can include at least one of water or steam. In some embodiments, the cooling fluid supply 202 includes recycled cooling fluid (e.g., water) routed through the turbine engine 10, cooling fluid captured in exhaust of the turbine engine 10 (e.g., the embodiment of FIG. 2), or cooling fluid from the environment (e.g., metal organics) on the climb leg and the descent leg of a respective mission. In this way, the cooling fluid system 200 is a closed system that produces the cooling fluid 69 and supplies the cooling fluid 69 to the combustor 26. In some embodiments, a portion of the cooling fluid 69 is returned to the cooling fluid supply 202, as detailed further below. In some embodiments, the cooling fluid tank 204 can be filled with the cooling fluid when the aircraft is on the ground, for example, by a user (e.g., a maintenance technician, or the like).

Figure 3:
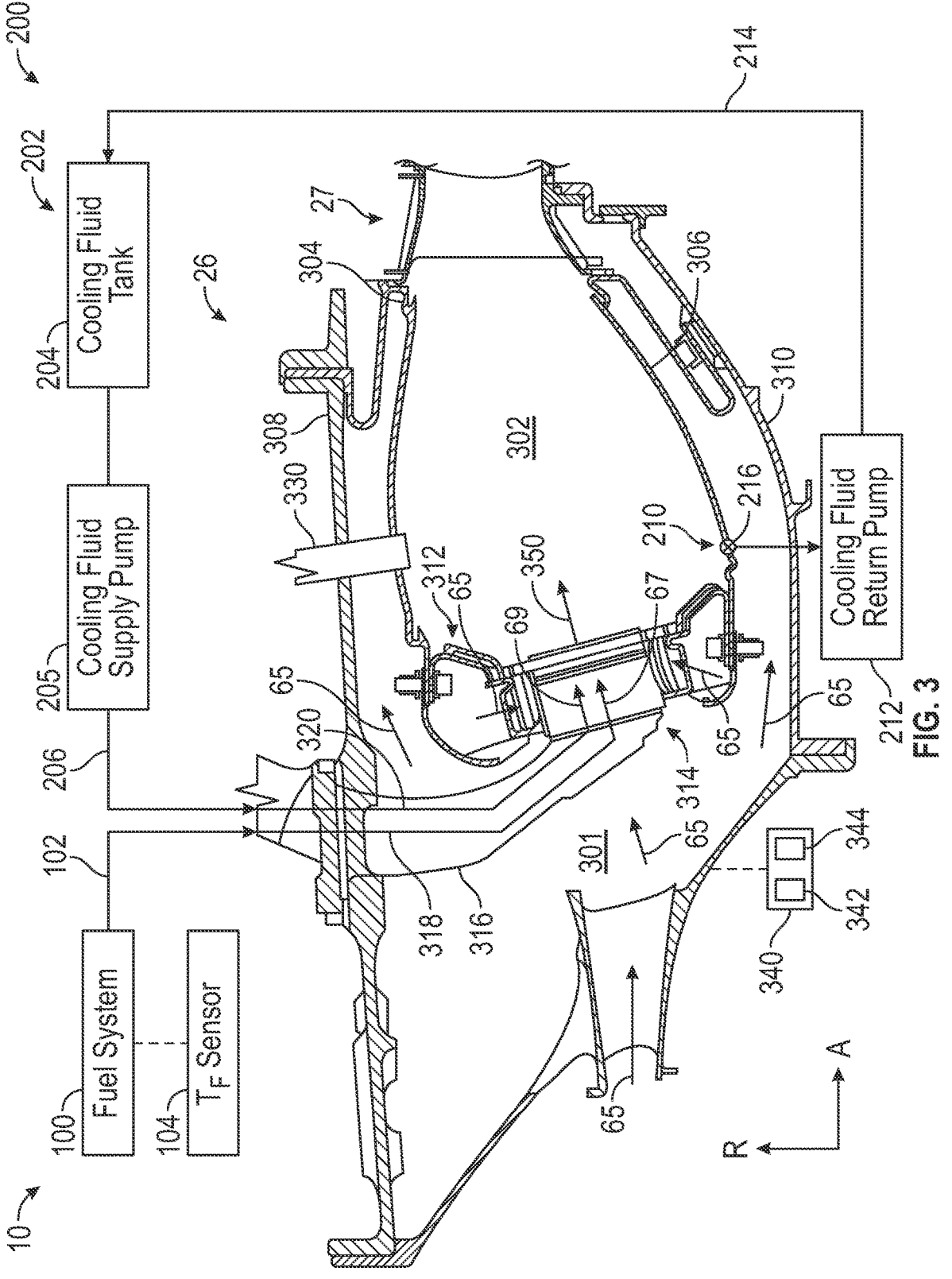
FIG. 3 is a schematic cross-sectional diagram of a combustor of the turbine engine of FIG. 1, taken at detail 3 in FIG. 1, according to the present disclosure.

FIG. 3 is a schematic cross-sectional diagram of the combustor 26, taken at detail 3 in FIG. 1, according to the present disclosure. As depicted, the combustor 26 includes a diffuser section 301 and a combustion chamber 302 positioned downstream of the diffuser section 301. The diffuser section 301 is in fluid communication with the compressor section 21 (FIG. 1) for receiving the compressed air 65, as detailed further below.

The combustion chamber 302 is defined by an outer liner 304 and an inner liner 306. The outer liner 304 and the inner liner 306 are annular about the longitudinal centerline axis 12 (FIG. 1) of the turbine engine 10. The combustor 26 is an annular combustor. The combustor 26, however, can include any type of combustor, such as, for example, annular combustors, double annular combustors, can-annular combustors, or the like. In some embodiments, the outer liner 304 and the inner liner 306 are annular about a longitudinal centerline axis of the combustion chamber 302. The outer liner 304 defines a radially outer boundary of the combustion chamber 302, and the inner liner 306 defines a radially inner boundary of the combustion chamber 302. The outer liner 304 and the inner liner 306 are disposed between an outer combustor casing 308 and an inner combustor casing 310 that each extends circumferentially about the outer liner 304 and the inner liner 306, respectively. The combustor 26 also includes an annular dome 312 mounted upstream from the outer liner 304 and the inner liner 306. The annular dome 312 defines an upstream end of the combustion chamber 302.

One or more mixer assemblies 314 (only one is shown in FIG. 3) are spaced circumferentially about the annular dome 312 to deliver a mixture of the fuel 67, the compressed air 65, and the cooling fluid 69 to the combustion chamber 302. In some embodiments, the one or more mixer assemblies 314 are disposed through at least one of the annular dome 312, the outer liner 304, or the inner liner 306. One or more fuel nozzles 316 (only one is shown in FIG. 3) are coupled in flow communication with the combustion chamber 302 through the annular dome 312. In some embodiments, the one or more fuel nozzles 316 are coupled through at least one of the annular dome 312, the outer liner 304, or the inner liner 306. A respective fuel nozzle 316 is coupled in flow communication with a respective mixer assembly 314 for supplying the fuel 67 to the respective mixer assembly 314. The one or more fuel nozzles 316 are in fluid communication with the fuel system 100 for receiving the fuel 67 therein, and with the cooling fluid system 200 for receiving the cooling fluid 69 therein. Each of the one or more fuel nozzles 316 includes a fuel nozzle fuel line 318 and a fuel nozzle cooling fluid line 320. The fuel nozzle fuel line 318 is fluidly coupled with the one or more fuel supply lines 102. The fuel nozzle cooling fluid line 320 is fluidly coupled with the one or more cooling fluid supply lines 206.

Downstream of the mixer assembly 314 is an igniter 330 that extends through the outer combustor casing 308 and into the combustion chamber 302 to provide initial ignition of the mixture of the compressed air 65 and the fuel 67. In various embodiments, the igniter 330 can provide continuous or intermittent ignition support to the combustion chamber 302. In some embodiments, the igniter 330 extends through the inner combustor casing 310.

As shown in FIG. 3, the fuel system 100 also includes a fuel temperature (TF) sensor 104 for sensing a temperature of the fuel 67. In particular, the fuel temperature sensor 104 senses the temperature of the fuel 67 in at least one of the one or more fuel supply lines 102 or the fuel nozzle fuel line 318. The fuel temperature sensor 104 can include any type of sensor or virtual sensor for sensing fuel temperature and indicating values indicative of fuel temperature. The fuel temperature sensor 104 converts the sensed fuel temperatures into electrical signals and sends the electrical signals to the controller 604 (FIG. 1), as detailed further below.

The cooling fluid system 200 also includes one or more cooling fluid drain ports 210, a cooling fluid return pump 212, and a cooling fluid return line 214. The one or more cooling fluid drain ports 210 are disposed through at least one of the outer liner 304 or the inner liner 306 of the combustor 26. In particular, the one or more cooling fluid drain ports 210 are positioned at a lowest point (e.g., a six o'clock position) of the combustion chamber 302 such that the cooling fluid 69 collects about the one or more cooling fluid drain ports 210 due to gravity. In FIG. 3, the one or more cooling fluid drain ports 210 are disposed through the inner liner 306. The one or more cooling fluid drain ports 210, however, can be disposed through the outer liner 304, or can be disposed through both the outer liner 304 and the inner liner 306. For example, when the combustor 26 is an annular combustor, the outer liner 304 is disposed below the inner liner 306 in the bottom portion 13 (FIG. 1) of the turbine engine 10, such that the cooling fluid 69 collects on the outer liner 304 in the bottom portion 13. In such embodiments, the one or more cooling fluid drain ports 210 are disposed through the outer liner 304.

The cooling fluid return pump 212 is in fluid communication with the one or more cooling fluid drain ports 210 and the cooling fluid return line 214. The cooling fluid return line 214 is in fluid communication with the cooling fluid supply 202. In particular, the cooling fluid return line 214 is in fluid communication with the cooling fluid tank 204 of the cooling fluid supply 202. The cooling fluid system 200 also includes one or more cooling fluid drain port valves 216 in fluid communication with the one or more cooling fluid drain ports 210. The one or more cooling fluid drain port valves 216 open to allow the cooling fluid 69 to flow through the one or more cooling fluid drain ports 210. The one or more cooling fluid drain port valves 216 close to prevent the cooling fluid 69 from flowing through the one or more cooling fluid drain ports 210.

The combustor 26 also includes one or more combustor inlet sensors 340 positioned upstream of the combustion chamber 302. The one or more combustor inlet sensors 340 sense operating conditions at the inlet (e.g., inlet operating conditions) of the combustor 26 (e.g., operating conditions of the compressed air 65 entering the combustor 26). For example, the one or more combustor inlet sensors 340 are positioned in fluid communication with the diffuser section 301. The one or more combustor inlet sensors 340 are positioned to sense conditions of the compressed air 65 flowing from the compressor section 21 (FIG. 1) into the combustor 26. The one or more combustor inlet sensors 340 include a combustor inlet pressure sensor 342 for sensing a combustor inlet pressure of the compressed air 65 entering the combustor 26 and a combustor inlet temperature sensor 344 for sensing a combustor inlet temperature of the compressed air 65 entering the combustor 26. The one or more combustor inlet sensors 340 can include any type of sensor or virtual sensor for sensing pressure and temperature and indicating values indicative of pressure and temperature. The one or more combustor inlet sensors 340 convert the sensed pressures and the sensed temperatures into electrical signals and send the electrical signals to the controller 604 (FIG. 1), as detailed further below.

In operation, the fuel system 100 supplies the fuel 67 through the one or more fuel supply lines 102 to the one or more fuel nozzles 316 through the fuel nozzle fuel line 318. The cooling fluid system 200 supplies the cooling fluid 69 from the cooling fluid supply 202 through the one or more cooling fluid supply lines 206 to the one or more fuel nozzles 316 through the fuel nozzle cooling fluid line 320. In particular, the cooling fluid supply pump 205 pumps the cooling fluid 69 from the cooling fluid tank 204 through the one or more cooling fluid supply lines 206 to the one or more fuel nozzles 316. The cooling fluid system 200 selectively supplies the cooling fluid 69 to the one or more fuel nozzles 316. In some embodiments, the controller 604 (FIG. 1) can control the cooling fluid system 200 to selectively supply the cooling fluid 69 to the one or more fuel nozzles 316 based on operating conditions of the combustor 26 and a fuel nozzle temperature ($T_{FN}$) of the one or more fuel nozzles 316, as detailed further below.

The combustor 26 receives the compressed air 65 discharged from the compressor section 21 (FIG. 1) in the diffuser section 301 at a location upstream of the combustion chamber 302. The combustor 26 directs a portion of the compressed air 65 through the one or more mixer assemblies 314 such that the compressed air 65 is channeled through the one or more mixer assemblies 314. At the one or more mixer assemblies 314, the compressed air 65 is mixed with the fuel 67 from the one or more fuel nozzles 316 to generate a mixture 350 of the compressed air 65 and the fuel 67 that is discharged into the combustion chamber 302. The mixture 350 is ignited by the igniter 330 creating a flame within the combustion chamber 302 that burns the mixture 350 and provides combustion gases 66 that are channeled downstream to the turbine section 27 (only a portion of which is depicted in FIG. 3). In instances in which the cooling fluid system 200 supplies the cooling fluid 69 to the one or more fuel nozzles 316, the one or more mixer assemblies 314 also mix the cooling fluid 69 with the compressed air 65 and the fuel 67 such that the mixture 350 includes the compressed air 65, the fuel 67, and the cooling fluid 69. In such instances, the cooling fluid 69 cools the one or more fuel nozzles 316 and reduces a temperature of the flame in the combustion chamber 302 as compared to when the mixture 350 does not include the cooling fluid 69. Thus, the combustion gases 66 (FIG. 1) include the cooling fluid 69 (in a gaseous state) in such instances.

In some embodiments, the controller 604 (FIG. 1) can control the cooling fluid system 200 to selectively supply the cooling fluid 69 to the one or more fuel nozzles 316 based on the ambient air temperature (e.g., as sensed by the ambient air temperature sensor 80 in FIG. 1). In particular, the cooling fluid system 200 can supply the cooling fluid 69 to the one or more fuel nozzles 316 when the turbine engine 10 is shut down, as detailed further below.

Figure 4:
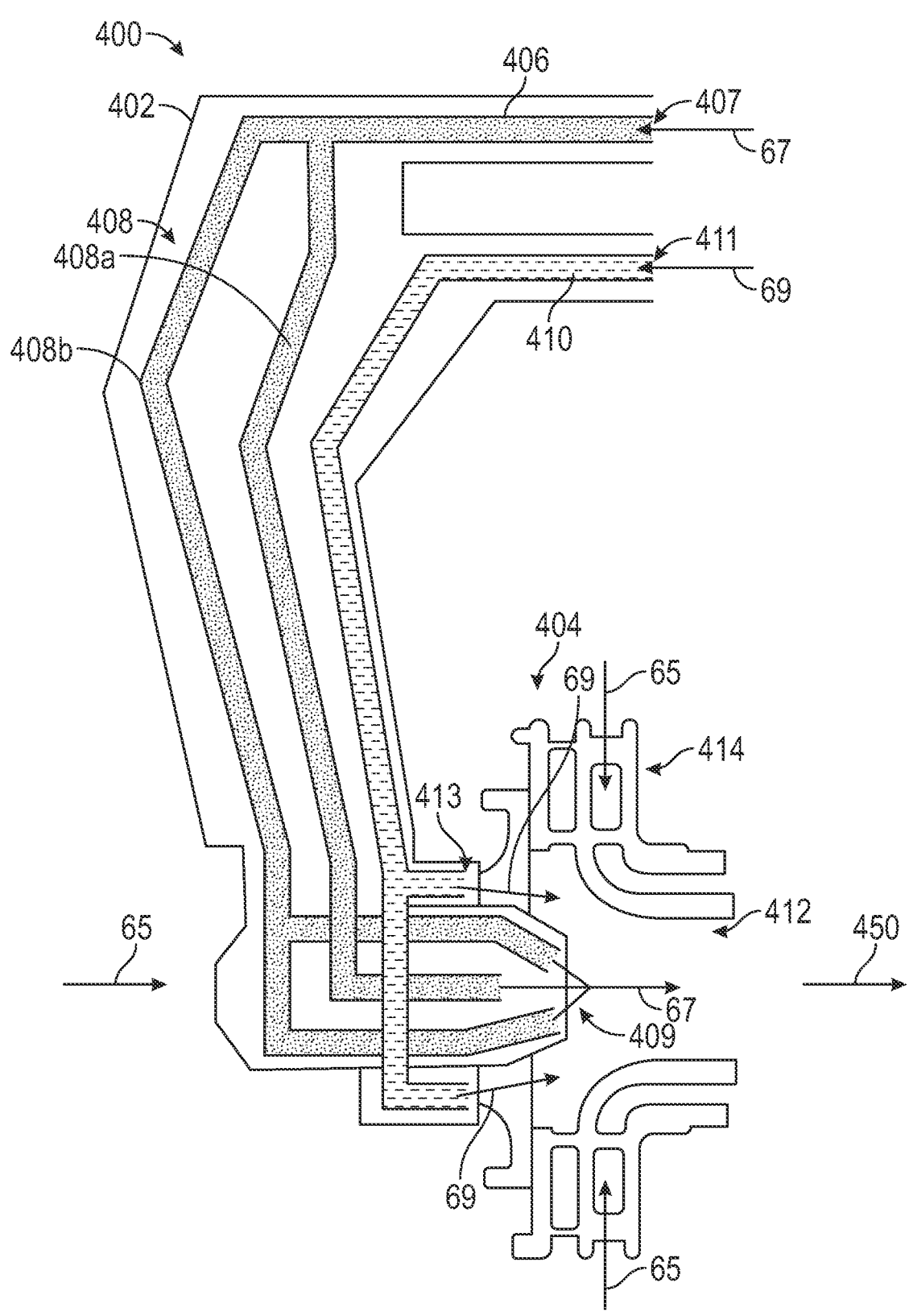
FIG. 4 is a schematic, internal view of a fuel nozzle assembly that can be used for the combustor of FIG. 3, according to the present disclosure.

FIG. 4 is a schematic, internal view of a fuel nozzle assembly 400 that can be used for the combustor 26 (FIGS.

1 to 3), according to the present disclosure. The fuel nozzle assembly 400 includes a fuel nozzle 402 and a mixer assembly 404. The fuel nozzle 402 is fluidly coupled with the mixer assembly 404. The fuel nozzle 402 can embody the one or more fuel nozzles 316 of FIG. 3 and the mixer assembly 404 can embody the one or more mixer assemblies 314 of FIG. 3. The fuel nozzle 402 includes a fuel nozzle fuel line 406 having a fuel inlet 407 that is in fluid communication with the one or more fuel supply lines 102 (FIG. 3) of the fuel system 100 (FIG. 3). The fuel nozzle fuel line 406 includes one or more fuel nozzle fuel circuit lines 408. The one or more fuel nozzle fuel circuit lines 408 include a primary fuel circuit line 408a and a secondary fuel circuit line 408b. The fuel nozzle 402 includes a fuel outlet 409. The one or more fuel nozzle fuel circuit lines 408 are in fluid communication with the fuel outlet 409 for injecting the fuel 67 through the fuel outlet 409 and into the combustion chamber 302 (FIG. 3).

The fuel nozzle 402 also includes a fuel nozzle cooling fluid line 410. The fuel nozzle cooling fluid line 410 includes a cooling fluid inlet 411 that is in fluid communication with the one or more cooling fluid supply lines 206 (FIG. 3) of the cooling fluid system 200 (FIG. 3). The fuel nozzle 402 includes one or more cooling fluid outlets 413. The fuel nozzle cooling fluid line 410 is in fluid communication with the one or more cooling fluid outlets 413 for injecting the cooling fluid 69 through the one or more cooling fluid outlets 413 and into the combustion chamber 302 (FIG. 3). The primary fuel circuit line 408a, the secondary fuel circuit line 408b, and the fuel nozzle cooling fluid line 410 are shown schematically in FIG. 4, and only a portion of the primary fuel circuit line 408a, the secondary fuel circuit line 408b, and the fuel nozzle cooling fluid line 410 is shown in FIG. 4. The fuel nozzle cooling fluid line 410 is concentric with the primary fuel circuit line 408a and with the secondary fuel circuit line 408b. In particular, the secondary fuel circuit line 408b is disposed radially outward of the primary fuel circuit line 408a, and the fuel nozzle cooling fluid line 410 is disposed radially outward of the secondary fuel circuit line 408b. In this way, the fuel nozzle cooling fluid line 410 is in thermal communication with the one or more fuel nozzle fuel circuit lines 408 (e.g., with the primary fuel circuit line 408a and with the secondary fuel circuit line 408b).

The mixer assembly 404 includes a mixer assembly fuel passage 412 that is in fluid communication with the fuel outlet 409 of the fuel nozzle 402 and with the one or more cooling fluid outlets 413. The mixer assembly 404 also includes an air swirler 414 for swirling the compressed air 65.

In operation, the fuel system 100 (FIG. 3) supplies the fuel 67 to the fuel nozzle 402 through the fuel inlet 407 and into the fuel nozzle fuel line 406. The fuel nozzle fuel line 406 selectively directs the fuel 67 into the one or more fuel nozzle fuel circuit lines 408. The one or more fuel nozzle fuel circuit lines 408 can include valves that open or close to selectively direct the fuel 67 through the one or more fuel nozzle fuel circuit lines 408. In particular, the fuel nozzle fuel line 406 directs the fuel 67 into the primary fuel circuit line 408a during low power conditions, mid-level power conditions, and during high power conditions. The fuel nozzle fuel line 406 directs the fuel 67 into the secondary fuel circuit line 408b only during mid-level conditions or high power conditions to provide additional fuel during such conditions. The one or more fuel nozzle fuel circuit lines 408 direct the fuel 67 through the fuel outlet 409 and into the mixer assembly fuel passage 412.

The cooling fluid system 200 (FIG. 3) selectively supplies the cooling fluid 69 to the fuel nozzle 402 through the cooling fluid inlet 411 and into the fuel nozzle cooling fluid line 410. The fuel nozzle cooling fluid line 410 directs the cooling fluid 69 through the one or more cooling fluid outlets 413 and into the mixer assembly fuel passage 412. In this way, the cooling fluid 69 cools the fuel nozzle 402.

At the same time, the mixer assembly 404 directs the compressed air 65 through the air swirler 414 to swirl the compressed air 65. The swirl of the compressed air 65 helps to mix the compressed air 65 with the fuel 67 and the cooling fluid 69. Thus, the mixer assembly 404 mixes the compressed air 65, the fuel 67, and the cooling fluid 69 to generate a mixture 450 of the compressed air 65, the fuel 67, and the cooling fluid 69. The fuel nozzle assembly 400 injects the mixture 450 into the combustion chamber 302 (FIG. 3) where the mixture 450 is ignited to generate the combustion gases 66 (FIG. 1).

Figure 5:
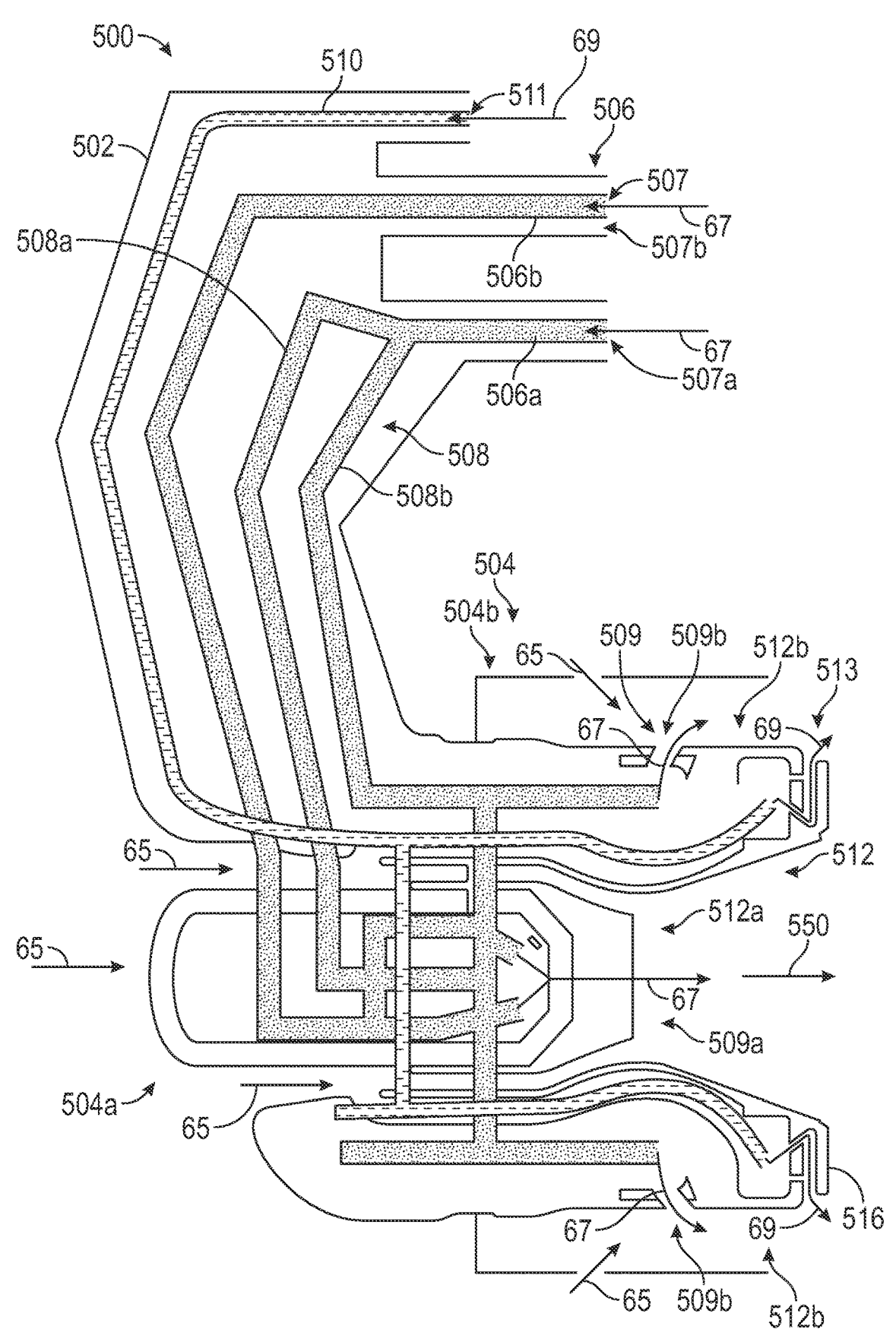
FIG. 5 is a schematic, internal view of a fuel nozzle assembly that can be used for the combustor of FIG. 3, according to another embodiment.

FIG. 5 is a schematic, internal view of a fuel nozzle assembly 500 that can be used for the combustor 26 (FIGS. 1 to 3), according to another embodiment. The fuel nozzle assembly 500 includes a fuel nozzle 502 and a mixer assembly 504. The fuel nozzle 502 is fluidly coupled with the mixer assembly 504. The fuel nozzle 502 can embody the one or more fuel nozzles 316 of FIG. 3 and the mixer assembly 504 can embody the one or more mixer assemblies 314 of FIG. 3.

The fuel nozzle 502 includes one or more fuel nozzle fuel lines 506 having one or more fuel inlets 507 that are in fluid communication with the one or more fuel supply lines 102 (FIG. 3) of the fuel system 100 (FIG. 3). The one or more fuel nozzle fuel lines 506 include a first fuel nozzle fuel line 506a having a first fuel inlet 507a, and a second fuel nozzle fuel line 506b having a second fuel inlet 507b. The first fuel inlet 507a is in fluid communication with a first fuel supply line of the one or more fuel supply lines 102 (FIG. 3), also referred to as a pilot primary/main fuel supply line. The second fuel inlet 507b is in fluid communication with a second fuel supply line of the one or more fuel supply lines 102, also referred to as a pilot secondary fuel supply line.

The first fuel nozzle fuel line 506a includes one or more fuel nozzle fuel circuit lines 508. The one or more fuel nozzle fuel circuit lines 508 include a primary pilot fuel circuit line 508a and a main fuel circuit line 508b. The second fuel nozzle fuel line 506b is also referred to as a secondary pilot fuel circuit line. The fuel nozzle 502 includes one or more fuel outlets 509. The one or more fuel nozzle fuel circuit lines 508 are in fluid communication with the one or more fuel outlets 509 for injecting the fuel 67 through the one or more fuel outlets 509 and into the combustion chamber 302 (FIG. 3). In particular, the one or more fuel outlets 509 include one or more first fuel outlets 509a and one or more second fuel outlets 509b. The one or more first fuel outlets 509a are oriented to inject the fuel 67 generally axially from the fuel nozzle 502. The one or more second fuel outlets 509b are oriented to inject the fuel 67 generally radially from the fuel nozzle 502.

The fuel nozzle 502 also includes a fuel nozzle cooling fluid line 510. The fuel nozzle cooling fluid line 510 includes a cooling fluid inlet 511 that is in fluid communication with the one or more cooling fluid supply lines 206 (FIG. 3) of the cooling fluid system 200 (FIG. 3). The fuel nozzle 502 includes one or more cooling fluid outlets 513. The fuel nozzle cooling fluid line 510 is in fluid communication with the one or more cooling fluid outlets 513 for injecting the cooling fluid 69 through the one or more cooling fluid outlets 513 and into the combustion chamber 302 (FIG. 3). The second fuel nozzle fuel line 406b, the primary pilot fuel circuit line 508a, the main fuel circuit line 508b, and the fuel nozzle cooling fluid line 510 are shown schematically in FIG. 5, and only a portion of the second fuel nozzle fuel line 406b, the primary pilot fuel circuit line 508a, the main fuel circuit line 508b, and the fuel nozzle cooling fluid line 510 is shown in FIG. 5. The fuel nozzle cooling fluid line 510 is concentric with the primary pilot fuel circuit line 508a, with the main fuel circuit line 508b, and with the second fuel nozzle fuel line 506b. In particular, the main fuel circuit line 508b is disposed radially outward of the primary pilot fuel circuit line 508a, the second fuel nozzle fuel line 506b is disposed radially outward of the main fuel circuit line 508b, and the fuel nozzle cooling fluid line 510 is disposed radially outward of the second fuel nozzle fuel line 506b. In this way, the fuel nozzle cooling fluid line 510 is in thermal communication with the one or more fuel nozzle fuel circuit lines 508 (e.g., with the primary pilot fuel circuit line 508a and with the main fuel circuit line 508b) and with the second fuel nozzle fuel line 506b.

The mixer assembly 504 is a twin annular premixing swirler (TAPS) that includes a pilot mixer 504a and a main mixer 504b. The main mixer 504b is concentrically aligned with respect to the pilot mixer 504a and extends circumferentially about the pilot mixer 504a. The mixer assembly 504 includes one or more mixer assembly fuel passages 512 that are in fluid communication with the one or more fuel outlets 509 of the fuel nozzle 502. In particular, the pilot mixer 504a includes a first mixer assembly fuel passage 512a and the main mixer 504b includes one or more second mixer assembly fuel passages 512b. The mixer assembly 504 also includes a mixer assembly heat shield 516 that protects the mixer assembly 504 from the hot combustion gases 66 (FIG. 1) in the combustion chamber 302 (FIG. 3).

In operation, the fuel system 100 (FIG. 3) supplies the fuel 67 to the fuel nozzle 502 through the one or more fuel inlets 507 and into the one or more fuel nozzle fuel lines 506. In particular, the first fuel inlet 507a directs the fuel 67 into the first fuel nozzle fuel line 506a, and the second fuel inlet 507b directs the fuel 67 into the second fuel nozzle fuel line 506b. The first fuel nozzle fuel line 506a selectively directs the fuel 67 into the one or more fuel nozzle fuel circuit lines 508. The one or more fuel nozzle fuel circuit lines 508 can include valves that open or close to selectively direct the fuel 67 through the one or more fuel nozzle fuel circuit lines 508. In particular, the first fuel nozzle fuel line 506a directs the fuel 67 into the primary pilot fuel circuit line 508a and directs the fuel 67 into the main fuel circuit line 508b.

The one or more fuel nozzle fuel circuit lines 508 and the second fuel nozzle fuel line 506b direct the fuel 67 through the one or more fuel outlets 509 and into the one or more mixer assembly fuel passages 512. In particular, the primary pilot fuel circuit line 508a and the second fuel nozzle fuel line 506b direct the fuel 67 through the one or more first fuel outlets 509a and into the first mixer assembly fuel passage 512a. The main fuel circuit line 508b directs the fuel 67 through the one or more second fuel outlets 509b and into the one or more second mixer assembly fuel passages 512b.

The cooling fluid system 200 (FIG. 3) selectively supplies the cooling fluid 69 to the fuel nozzle 502 through the cooling fluid inlet 511 and into the fuel nozzle cooling fluid line 510. The fuel nozzle cooling fluid line 510 directs the cooling fluid 69 through the one or more cooling fluid outlets 513. The cooling fluid 69 impinges on the mixer assembly heat shield 516 and is directed into the combustion chamber 302 (FIG. 3) to mix with the fuel 67 and the compressed air

65. In this way, the cooling fluid 69 cools the fuel nozzle 502 and cools the mixer assembly heat shield 516.

At the same time, the mixer assembly 504 directs the compressed air 65 through at least one of the pilot mixer 504*a* and the main mixer 504*b*. In particular, the pilot mixer 504*a* directs the compressed air 65 therethrough to mix with the fuel 67 in the first mixer assembly fuel passage 512*a*. The main mixer 504*b* directs the compressed air 65 therethrough to mix with the fuel 67 in the one or more second mixer assembly fuel passages 512*b*. Thus, the mixer assembly 504 mixes the compressed air 65, the fuel 67, and the cooling fluid 69 to generate a mixture 550 of the compressed air 65, the fuel 67, and the cooling fluid 69. The fuel nozzle assembly 500 injects the mixture 550 into the combustion chamber 302 (FIG. 3) where the mixture 550 is ignited to generate the combustion gases 66 (FIG. 1).

At engine start conditions and at engine low power operation (e.g., less than 30% of SLS maximum engine rated thrust) of the turbine engine 10 (FIG. 1), such as at idle, at taxi, or at descent, the fuel nozzle assembly 500 uses only fuel 67 provided to the pilot mixer 504*a* for generating combustion gases 66. For example, the fuel nozzle assembly 500 uses only the fuel 67 in the primary pilot fuel circuit line 508*a* and the secondary pilot fuel circuit line (e.g., the second fuel nozzle fuel line 506*b*). At the pilot mixer 504*a*, the fuel 67 includes a pilot fuel stream that is mixed with a first portion of the compressed air 65 to provide a rich fuel-air mixture (e.g., higher fuel-to-air ratios within the mixture) that is ignited for a pilot flame within a region that is adjacent to the pilot mixer 504*a* within the combustion chamber 302 (FIG. 3).

At high power operation (e.g., greater than 85% of SLS maximum engine rated thrust) of the turbine engine 10 (FIG. 1), such as at takeoff or at climb, and at mid-level power operation (e.g., 30% to 85% of SLS maximum engine rated thrust) of the turbine engine 10 (FIG. 1), such as at cruise, the fuel nozzle assembly 500 uses a fuel 67 split between the pilot mixer 504*a* and the main mixer 504*b* for generating combustion gases 66. In particular, the fuel nozzle assembly 500 uses the fuel 67 in the primary pilot fuel circuit line 508*a*, the main fuel circuit line 508*b*, and the secondary pilot fuel circuit line (e.g., the second fuel nozzle fuel line 506*b*). At the main mixer 504*b*, the fuel 67 includes a main fuel stream that is mixed with a second portion of the compressed air 65 to provide a lean fuel-air mixture (e.g., lower fuel-to-air ratios within the mixture) that is ignited for a main flame within a region that is adjacent to the main mixer 504*b* within the combustion chamber 302 (FIG. 3). Thus, fuel nozzle assembly 500 assists in providing a lean burn combustion process to generate the combustion gases 66 while reducing $NO_x$ emissions by operating fuel lean. Further, the lean burn combustion process provides for low non-volatile particulate matter (nvPM), such as soot or smoke, and reduces $NO_x$ emissions.

Figure 6:
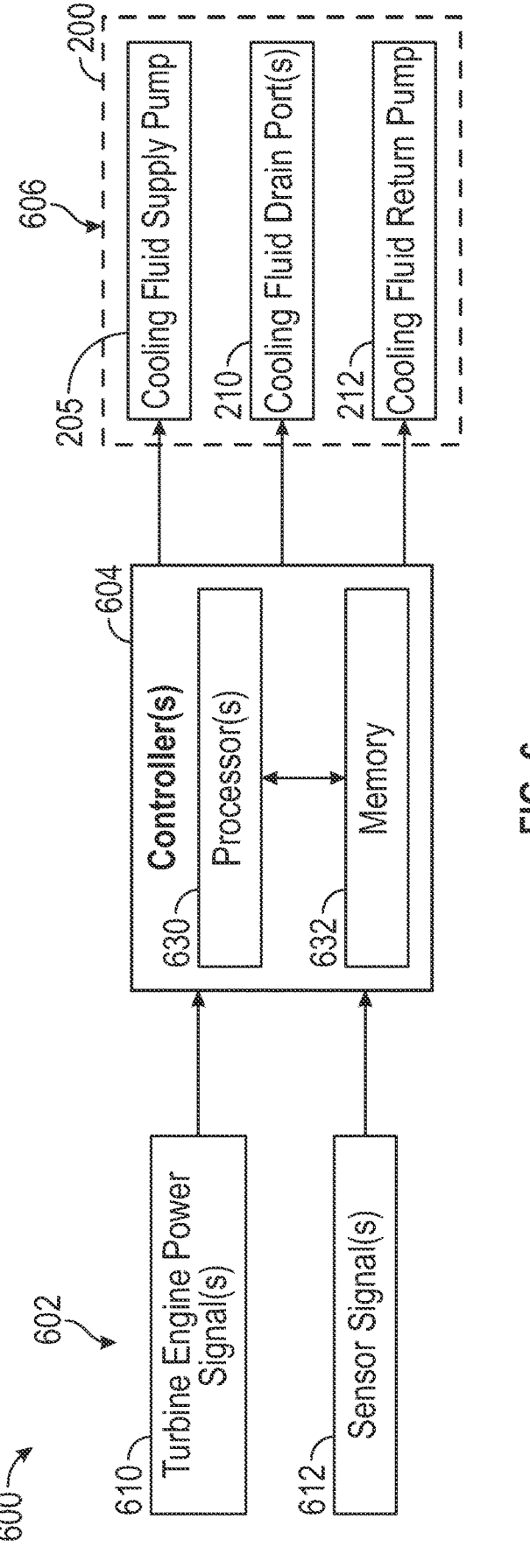
FIG. 6 is a schematic view of a cooling fluid control system for the turbine engine of FIG. 1, according to the present disclosure.

FIG. 6 is a schematic view of a cooling fluid control system 600 for the turbine engine 10 (FIG. 1), according to the present disclosure. The cooling fluid control system 600 includes inputs 602, the controller 604, and outputs 606. The inputs 602 include one or more turbine engine power signals 610 from the turbine engine 10 (FIG. 1), and one or more sensor signals 612 from at least one of the ambient air temperature sensor 80 (FIG. 1) or the one or more combustor inlet sensors 340 (FIG. 3).

The one or more turbine engine power signals 610 are indicative of a power level of the turbine engine 10. The power level is a function of the torque produced by the turbine and the rotational speed of the turbine. In some embodiments, the power level is a function of the amount of thrust produced by the turbine engine 10. For example, during takeoff and climb conditions, the turbine engine 10 (FIG. 1) operates at high power operation (e.g., greater than 85% of SLS maximum engine rated thrust), during cruise, the turbine engine 10 (FIG. 1) operates at mid-level power operation (e.g., 30% to 85% of SLS maximum engine rated thrust), and during idle, taxiing, and descent, the turbine engine 10 (FIG. 1) operates at low power operation (e.g., less than 30% of SLS maximum engine rated thrust). The power output of the turbine engine 10 corresponds to the combustor inlet pressure and the combustor inlet temperature of the compressed air 65 at the combustor 26 (FIG. 2) as sensed by the combustor inlet pressure sensor 342 (FIG. 3) and the combustor inlet temperature sensor 344 (FIG. 3), respectively. Higher combustor inlet pressures and higher combustor inlet temperatures correspond with higher power output, mid-level combustor inlet pressures and mid-level combustor inlet temperatures correspond with mid-level power output, and lower combustor inlet pressures and lower combustor inlet temperatures correspond with lower power output.

The one or more sensor signals 612 include electrical signals indicative of the ambient air temperature about the turbine engine 10 (e.g., one or more ambient air temperature signals) from the ambient air temperature sensor 80 (FIG. 1). The one or more sensor signals 612 also include electrical signals indicative of the operating conditions at the inlet of the combustor 26 (FIG. 3), particularly, at the diffuser section 301 (FIG. 3). For example, the one or more sensor signals 612 include at least one of electrical signals indicative of the pressure at the inlet of the combustor 26 (e.g., one or more combustor inlet pressure signals) from the combustor inlet pressure sensor 342 (FIG. 3) or electrical signals indicative of the temperature at the inlet of the combustor 26 (e.g., one or more combustor inlet temperature signals) from the combustor inlet temperature sensor 344 (FIG. 3).

The outputs 606 include the cooling fluid system 200. In particular, the outputs 606 include the cooling fluid supply pump 205, the one or more cooling fluid drain ports 210, and the cooling fluid return pump 212. The controller 604 receives the inputs 602, implements a method (e.g., at least one of a method 700 or a method 800) of operating the cooling fluid system 200, and controls the outputs 606, as described with reference to FIGS. 7 and 8, respectively, below.

The controller 604 may be a standalone controller or may be part of an engine controller to operate various systems of the turbine engine 10 (FIG. 1). In this embodiment, the controller 604 is a computing device having one or more processors 630 and a memory 632. The one or more processors 630 can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory 632 can include one or more computer-readable media, including, but not limited to, non-transitory computer-readable media, a computer readable non-volatile medium (e.g., a flash memory), a RAM, a ROM, hard drives, flash drives, or other memory devices.

The memory 632 can store information accessible by the one or more processors 630, including computer-readable instructions that can be executed by the one or more processors 630. The instructions can be any set of instructions or a sequence of instructions that, when executed by the one or more processors 630, cause the one or more processors 630 and the controller 604 to perform operations. The controller 604 and, more specifically, the one or more processors 630 are programmed or configured to perform these operations, such as the operations discussed further below. In some embodiments, the instructions can be executed by the one or more processors 630 to cause the one or more processors 630 to complete any of the operations and functions for which the controller 604 is configured, as will be described further below. The instructions can be software written in any suitable programming language or can be implemented in hardware. Additionally, or alternatively, the instructions can be executed in logically or virtually separate threads on the processors 630. The memory 632 can further store data that can be accessed by the one or more processors 630.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 604 is communicatively coupled to the ambient air temperature sensor 80 (FIG. 1), the one or more combustor inlet sensors 340 (FIG. 4), and the cooling fluid system 200 (e.g., the cooling fluid supply pump 205, the one or more cooling fluid drain ports 210, and the cooling fluid return pump 212). The controller 604 receives the inputs 602 and controls the outputs 606, as detailed further below.

Figure 7:
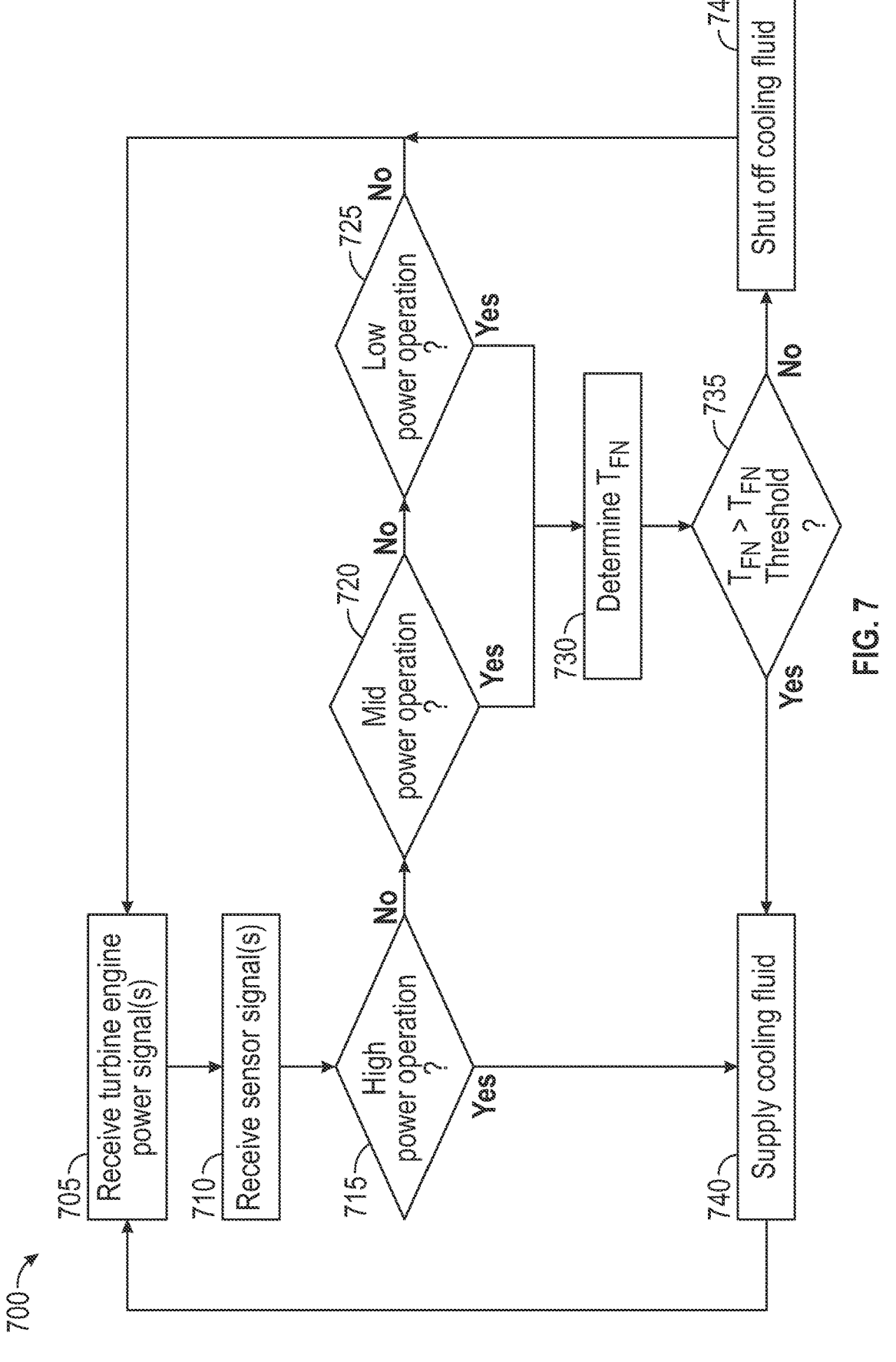
FIG. 7 is a flowchart of a method of operating a cooling fluid system of the turbine engine of FIGS. 1 to 3, according to the present disclosure.

FIG. 7 is a flowchart of a method 700 of operating the cooling fluid system 200 of the turbine engine 10, according to the present disclosure. The method 700 is performed after engine start while the turbine engine 10 is operating. The turbine engine 10 operates as detailed above with respect to FIGS. 1 to 3. During operation of the turbine engine 10, the controller 604 (FIG. 6) controls the cooling fluid system 200 according to the method 700. For the method 700, reference is made to FIGS. 3 and 6.

In step 705, the controller 604 receives the one or more turbine engine power signals 610. The controller 604 determines a power level setting for the turbine engine 10 based on the one or more turbine engine power signals 610. For example, the controller 604 determines that the turbine engine 10 is operating at low power operation (e.g., less than 30% of SLS maximum engine rated thrust), is operating at mid-level power operation (e.g., 30% to 85% of SLS maximum engine rated thrust), or is operating at high power operation (e.g., greater than 85% of SLS maximum engine rated thrust).

In step 710, the controller 604 receives the one or more sensor signals 612. For example, the controller 604 receives one or more combustor inlet sensor signals from the one or more combustor inlet sensors 340. The one or more sensor signals 612 indicate the combustor inlet pressure and the combustor inlet temperature at the inlet of the combustor 26 (e.g., a pressure and a temperature of the compressed air 65 entering the combustor 26). For example, the controller 604 determines whether the pressure is a high pressure, a mid-level pressure, or a low pressure and whether the temperature is a high temperature, a mid-level temperature, or a low temperature.

In step 715, the controller 604 determines whether the turbine engine 10 is in high power operation based on at least one of the power level setting, the combustor inlet pressure, or the combustor inlet temperature. High power operation, high combustor inlet pressures, and high combustor inlet temperatures indicate at least one of a takeoff condition or a climb condition of the mission cycle of the turbine engine 10 (FIG. 1). High power operation includes a combustor inlet pressure in a range of four hundred pounds per square inch to eight hundred pounds per square inch (400 psi to 800 psi). High power operation includes a combustor inlet temperature in a range of nine hundred degrees Fahrenheit to one thousand three hundred degrees Fahrenheit (900° F. to 1300° F.).

In step 720, if the turbine engine 10 is not in high power operation (step 715: No), the controller 604 determines whether the turbine engine 10 is in mid-level power operation based on at least one of the power level setting, the combustor inlet pressure, or the combustor inlet temperature. Mid-level power operation, mid-level combustor inlet pressures, and mid-level combustor inlet temperatures indicate a cruise condition of the mission cycle of the turbine engine 10 (FIG. 1). Mid-level power operation includes a combustor inlet pressure in a range of one hundred twenty pounds per square inch to three hundred pounds per square inch (120 psi to 300 psi). Mid-level power operation includes a combustor inlet temperature in a range of seven hundred degrees Fahrenheit to one thousand two hundred degrees Fahrenheit (700° F. to 1200° F.).

In step 725, if the turbine engine 10 is not in mid-level power operation (step 720: No), the controller 604 determines whether the turbine engine 10 is in low power operation based on at least one of the power level setting, the combustor inlet pressure, or the combustor inlet temperature. Low power operation, low combustor inlet pressures, and low combustor inlet temperatures indicate at least one of a taxiing condition, a descent condition, or an approach condition of the mission cycle of the turbine engine 10 (FIG. 1). Low power operation includes a combustor inlet pressure in a range of forty pounds per square inch to two hundred fifty pounds per square inch (40 psi to 250 psi). Low power operation includes a combustor inlet temperature in a range of five hundred degrees Fahrenheit to nine hundred degrees Fahrenheit (500° F. to 700° F.). If the turbine engine 10 is not in low power operation, the method 700 restarts at step 705.

In step 730, if the turbine engine 10 is in at least one of mid-power operation or low power operation (step 720: Yes, or step 725: Yes), the controller 604 determines a fuel nozzle temperature ($T_{FN}$) of the one or more fuel nozzles 316. The fuel nozzle temperature is a temperature of one or more surfaces of the one or more fuel nozzles 316. For example, the fuel nozzle temperature can be a wetted wall temperature of the one or more fuel nozzles 316. The wetted wall temperature is a temperature of the surfaces (e.g., the metal) of the one or more fuel nozzles 316 after heat transfer occurs from at least one of the fuel 67 or the compressed air 65 to the surfaces of the one or more fuel nozzles 316. The controller 604 determines the fuel nozzle temperature based on the turbine engine operating conditions. In particular, the controller 604 determines the fuel nozzle temperature based on at least one of the combustor inlet pressure, the combustor inlet temperature, a fuel flow rate of the fuel 67 through the one or more fuel nozzles 316, or a fuel temperature of the fuel 67 through the one or more fuel nozzles 316. Preferably, the controller 604 determines the fuel nozzle temperature based on the combustor inlet pressure, the combustor inlet temperature, a fuel flow rate of the fuel 67 through the one or more fuel nozzles 316, and a fuel temperature of the fuel 67 through the one or more fuel nozzles 316. For example, the controller 604 stores empirical model data (e.g., in the memory 632) that maps values of the fuel nozzle temperature of the one or more fuel nozzles 316 for particular values of the combustor inlet pressure, the combustor inlet temperature, the fuel flow rate, and the fuel temperature. Thus, the controller 604 determines the fuel nozzle temperature of the one or more fuel nozzles 316 based on the stored empirical model data for measured values or sensed values of the combustor inlet pressure, the combustor inlet temperature, the fuel flow rate, and the fuel temperature. In some embodiments, the turbine engine 10 includes one or more fuel nozzle temperature sensors that sense the fuel nozzle temperature of the one or more fuel nozzles 316. In such embodiments, the turbine engine 10 receives the sensed fuel nozzle temperature and determines the fuel nozzle temperature based on the sensed fuel nozzle temperature.

In step 735, the controller 604 determines whether the fuel nozzle temperature of the one or more fuel nozzles 316 is greater than a fuel nozzle temperature ($T_{FN}$) threshold. The fuel nozzle temperature threshold corresponds to a fuel nozzle temperature at which the fuel 67 in the one or more fuel nozzles 316 begins to coke. The fuel nozzle temperature threshold is in a range of three hundred forty degrees Fahrenheit to three hundred seventy degrees Fahrenheit (340° F. to 370° F.). Preferably, the fuel nozzle temperature threshold is three hundred fifty degrees Fahrenheit (350° F.). The fuel nozzle temperature threshold can vary based on a particular type of fuel used in the turbine engine 10.

In step 740, if the fuel nozzle temperature is greater than the fuel nozzle temperature threshold (step 735: Yes), the controller 604 controls the cooling fluid system 200 to supply the cooling fluid 69 through the one or more fuel nozzles 316. In step 740, the controller 604 can also control the cooling fluid system 200 to supply the cooling fluid 69 through the one or more fuel nozzles 316 if the turbine engine 10 is operating in the high power operation (step 715: Yes). In particular, the controller 604 controls the cooling fluid supply pump 205 to pump the cooling fluid 69 from the cooling fluid tank 204 through the one or more cooling fluid supply lines 206 and to the one or more fuel nozzles 316. Thus, the controller 604 controls the cooling fluid system 200 to supply the cooling fluid 69 through the one or more fuel nozzles 316 when the turbine engine 10 is in the high power operation, and when the turbine engine 10 is in at least one of the mid-level power operation or the low power operation and the fuel nozzle temperature is greater than the fuel nozzle temperature threshold. The cooling fluid 69 flows through the one or more fuel nozzles 316 and into the combustion chamber 302, as detailed above with respect to FIG. 3. The method 700 then proceeds back to step 705.

In step 745, if the fuel nozzle temperature is less than or equal to the fuel nozzle temperature threshold (step 735: No), the controller 604 controls the cooling fluid system 200 to shut off the cooling fluid 69 to prevent the cooling fluid 69 from flowing through the one or more fuel nozzles 316. In particular, the controller 604 controls the cooling fluid supply pump 205 to shut off the cooling fluid supply pump 205 to prevent the cooling fluid supply pump 205 from pumping the cooling fluid 69 from the cooling fluid tank 204. The method 700 then proceeds back to step 705.

Figure 8:
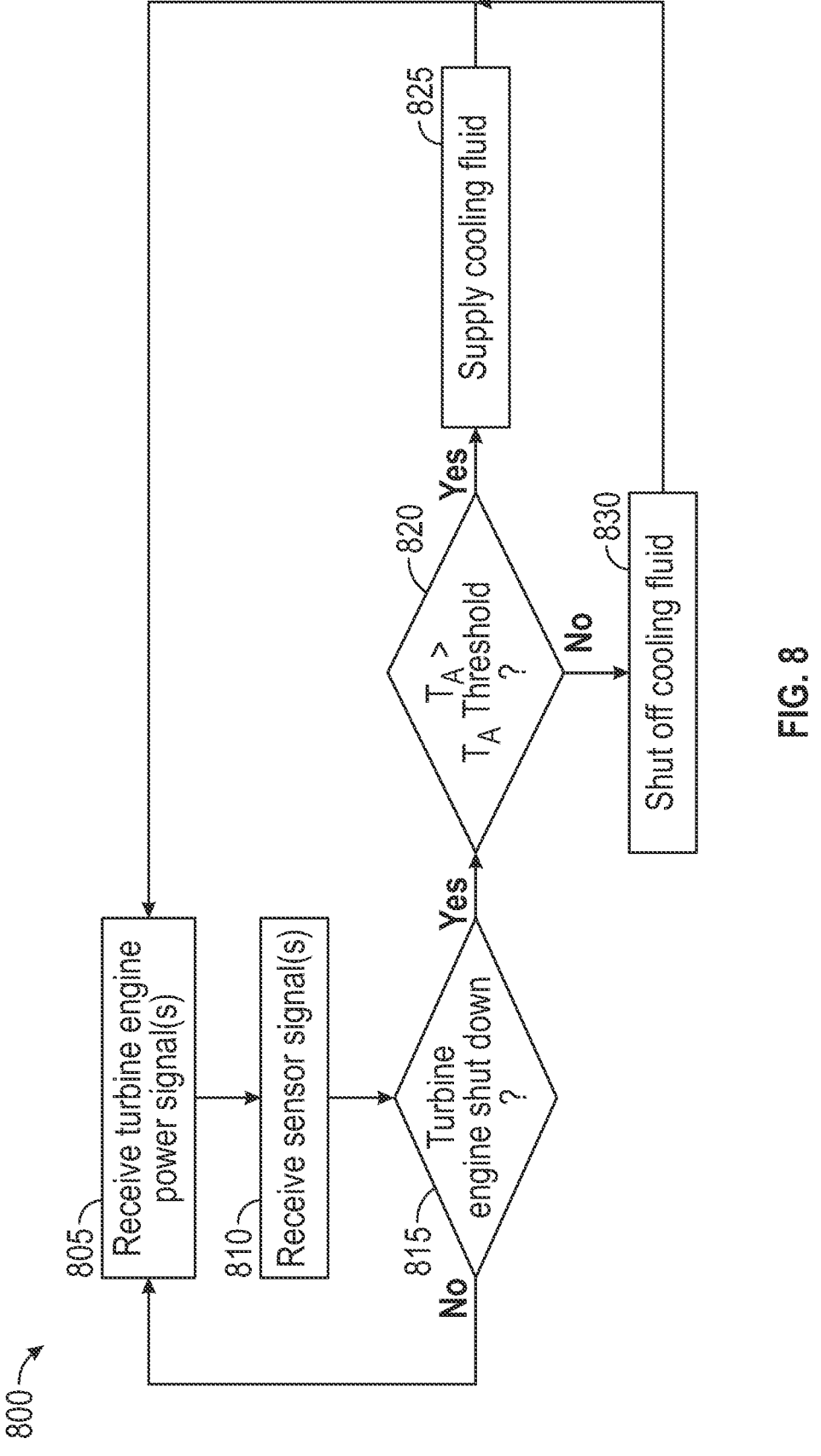
FIG. 8 is a flowchart of a method of operating the cooling fluid system of the turbine engine of FIGS. 1 to 3, according to another embodiment.

FIG. 8 is a flowchart of a method 800 of operating the cooling fluid system 200 of the turbine engine 10, according to another embodiment. The method 800 is performed after operation when the turbine engine 10 is shut down. In such instances, the controller 604 and the cooling fluid system 200 (e.g., the cooling fluid return pump 212) can be powered by a battery, a generator, or an auxiliary power unit of the turbine engine 10 or the aircraft. For the method 800, reference is made to FIGS. 3 and 6.

In step 805, the controller 604 receives the one or more turbine engine power signals 610. The controller 604 determines a power level setting for the turbine engine 10 based on the one or more turbine engine power signals 610.

In step 810, the controller 604 receives the one or more sensor signals 612. For example, the controller 604 receives the one or more ambient air temperature signals from the ambient air temperature sensor 80 (FIG. 1). The one or more sensor signals 612 indicate the ambient air temperature of the air surrounding the turbine engine 10.

In step 815, the controller 604 determines whether the turbine engine 10 is shut down. If the turbine engine 10 is operating (step 815: No), the method 800 proceeds back to step 805.

In step 820, if the turbine engine 10 is shut down (step 815: Yes), the controller 604 determines whether the ambient air temperature ($T_A$) is greater than an ambient air temperature ($T_A$) threshold. The ambient air temperature threshold corresponds to an ambient air temperature at which the ambient air temperature is not cold enough to prevent the fuel 67 from coking within the one or more fuel nozzles 316. The ambient air temperature threshold is in a range of thirty-two degrees Fahrenheit to thirty-five degrees Fahrenheit (32° F. to 35° F.). Preferably, the ambient air temperature threshold is thirty-five degrees Fahrenheit (35° F.). The ambient air temperature threshold can vary based on a particular type of fuel used in the turbine engine 10.

In step 825, if the ambient air temperature is greater than the ambient air temperature threshold (step 820: Yes), the controller 604 controls the cooling fluid system 200 to supply the cooling fluid 69 through the one or more fuel nozzles 316. In particular, the controller 604 controls the cooling fluid supply pump 205 to supply the cooling fluid 69 from the cooling fluid tank 204 through the one or more fuel nozzles 316 and into the combustion chamber 302. The cooling fluid 69 does not mix with the fuel 67 or the compressed air 65 since the turbine engine 10 is shut down. In particular, the fuel system 100 does not inject the fuel 67 and there is no compressed air 65 since the compressor section 21 (FIG. 1) is not operating. Thus, the cooling fluid 69 is injected through the one or more fuel nozzles 316 and into the combustion chamber 302.

The cooling fluid 69 collects in liquid form on at least one of the outer liner 304 or the inner liner 306 due to gravity. In particular, the cooling fluid 69 collects on the at least one of the outer liner 304 or the inner liner 306 about the one or more cooling fluid drain ports 210 due to gravity. The cooling fluid system 200 directs the cooling fluid 69 from the combustion chamber 302 to the cooling fluid supply 202 through the one or more cooling fluid drain ports 210. The controller 604 controls the one or more cooling fluid drain port valves 216 to open such that the cooling fluid 69 flows through the one or more cooling fluid drain ports 210. The controller 604 controls the cooling fluid return pump 212 to pump the cooling fluid 69 from the combustion chamber 302 to the cooling fluid supply 202 through the one or more cooling fluid drain ports 210 and through the cooling fluid return line 214 to the cooling fluid supply 202. In particular, the cooling fluid system 200 directs the cooling fluid 69 back to the cooling fluid tank 204 (FIG. 2) to be stored therein. In this way, the cooling fluid system 200 recycles the cooling fluid 69 through the one or more fuel nozzles 316 and back to the cooling fluid supply 202.

In step 830, if the ambient air temperature is less than or equal to the ambient air temperature threshold (step 820: No), the controller 604 controls the cooling fluid system 200 to shut off the cooling fluid 69 to the one or more fuel nozzles 316. In such instances, the ambient air temperature is cold enough to prevent the fuel 67 from heating and forming the coke.

Aspects and steps of the method 700 and the method 800 of FIGS. 7 and 8, respectively, detailed above may be combined. For example, the controller 604 can control the cooling fluid return pump 212 during operation of the turbine engine 10 to pump condensed cooling fluid back to the cooling fluid supply 202 to recycle the cooling fluid 69 through the cooling fluid system 200.

Accordingly, the cooling fluid injection of the method 700 provides lower emissions during the high power operation (e.g., higher temperatures) to suppress NO$_x$ emissions by injecting the cooling fluid 69 during the high power operation. The cooling fluid injection of the method 700 also prevents fuel coking in the one or more fuel nozzles 316 during the mid-level power operation and the low power operation, without increasing specific fuel consumption during such operations, by injecting the cooling fluid 69 only when the fuel nozzle temperature is greater than the fuel nozzle temperature threshold. Further, the method 800 prevents soak-back coking in the fuel 67 within the one or more fuel nozzles 316 when the turbine engine 10 is shut down. Thus, method 700 and the method 800 prevent fuel coking in the one or more fuel nozzles 316 to the turbine engine 10 (e.g., without using a blower to cool the hot air), without using fuel additives, and without having to use coke barrier coatings.

Further aspects of the present disclosure are provided by the subject matter of the following clauses.

A cooling fluid control system for a turbine engine having one or more fuel nozzles. The cooling fluid control system comprises a cooling fluid system in fluid communication with the one or more fuel nozzles for supplying a cooling fluid to the one or more fuel nozzles, and a controller that controls the cooling fluid system to supply the cooling fluid through the one or more fuel nozzles when the turbine engine is shut down.

The cooling fluid control system of the preceding clause, further comprising a cooling fluid supply pump, the controller controlling the cooling fluid supply pump to pump the cooling fluid to the one or more fuel nozzles.

The cooling fluid control system of any preceding clause, the controller controlling the cooling fluid system to supply the cooling fluid through the one or more fuel nozzles when an ambient air temperature about the turbine engine is greater than an ambient air temperature threshold.

The cooling fluid control system of any preceding clause, the controller controlling the cooling fluid system to shut off the cooling fluid to the one or more fuel nozzles when the ambient air temperature is less than or equal to the ambient air temperature threshold.

The cooling fluid control system of any preceding clause, the ambient air temperature threshold being in a range of 32° F. to 35° F.

The cooling fluid control system of any preceding clause, the turbine engine including a combustor having a combustion chamber, and the controller controls the cooling fluid system to inject the cooling fluid from the one or more fuel nozzles into the combustion chamber.

The cooling fluid control system of any preceding clause, the combustion chamber being defined by an outer liner and an inner liner, the cooling fluid system includes one or more cooling fluid drain ports disposed through at least one of the outer liner or the inner liner, and the controller controls the cooling fluid system to drain the cooling fluid in the combustion chamber through the one or more cooling fluid drain ports.

The cooling fluid control system of any preceding clause, the cooling fluid system including a cooling fluid tank, and the controller controls the cooling fluid system to return the cooling fluid from the combustion chamber to the cooling fluid tank to store the cooling fluid therein.

The cooling fluid control system of any preceding clause, the cooling fluid system including a cooling fluid return pump, and the controller controls the cooling fluid return pump to pump the cooling fluid from the combustion chamber to the cooling fluid tank.

The cooling fluid control system of any preceding clause, the controller controlling the cooling fluid system to supply the cooling fluid from the cooling fluid tank to the one or more fuel nozzles.

A method of operating a cooling fluid system for a turbine engine comprises supplying cooling fluid from the cooling fluid system through one or more fuel nozzles of the turbine engine when the turbine engine is shut down.

The method of the preceding clause, further comprising pumping, with a cooling fluid supply pump, the cooling fluid to the one or more fuel nozzles.

The method of any preceding clause, further comprising supplying the cooling fluid through the one or more fuel nozzles when an ambient air temperature about the turbine engine is greater than an ambient air temperature threshold.

The method of any preceding clause, further comprising shutting off the cooling fluid to the one or more fuel nozzles when the ambient air temperature is less than or equal to the ambient air temperature threshold.

The method of any preceding clause, the ambient air temperature threshold being in a range of 32° F. to 35° F.

The method of any preceding clause, the turbine engine including a combustor having a combustion chamber, and the method further comprises injecting the cooling fluid from the one or more fuel nozzles into the combustion chamber.

The method of any preceding clause, the combustion chamber being defined by an outer liner and an inner liner, the cooling fluid system includes one or more cooling fluid drain ports disposed through at least one of the outer liner or the inner liner, and the method further comprising draining the cooling fluid in the combustion chamber through the one or more cooling fluid drain ports.

The method of any preceding clause, the cooling fluid system including a cooling fluid tank, and the method further comprises returning the cooling fluid from the combustion chamber to the cooling fluid tank to store the cooling fluid therein.

The method of any preceding clause, further comprising pumping, with a cooling fluid return pump, the cooling fluid from the combustion chamber to the cooling fluid tank.

The method of any preceding clause, further comprising supplying the cooling fluid from the cooling fluid tank to the one or more fuel nozzles.

A cooling fluid control system for a turbine engine having one or more fuel nozzles. The cooling fluid control system comprises a cooling fluid system in fluid communication with the one or more fuel nozzles for supplying a cooling fluid to the one or more fuel nozzles, and a controller that controls the cooling fluid system to supply the cooling fluid through the one or more fuel nozzles when a fuel nozzle temperature of the one or more fuel nozzles is greater than a fuel nozzle temperature threshold during at least one of a mid-level power operation or a low power operation of the turbine engine.

The cooling fluid control system of the preceding clause, the controller controlling the cooling fluid system to shut off the cooling fluid to the one or more fuel nozzles when the fuel nozzle temperature is less than or equal to the fuel nozzle temperature threshold during the at least one of the mid-level power operation or the low power operation.

The cooling fluid control system of any preceding clause, the fuel nozzle temperature threshold corresponding to the fuel nozzle temperature of the one or more fuel nozzles at which fuel in the one or more fuel nozzles begins to coke.

The cooling fluid control system of any preceding clause, the fuel nozzle temperature threshold being in a range of 340° F. to 370° F.

The cooling fluid control system of any preceding clause, the mid-level power operation being during a cruise condition of the turbine engine, and the low power operation is during a descent condition or an approach condition of the turbine engine.

The cooling fluid control system of any preceding clause, further comprising a cooling fluid supply pump, the controller controlling the cooling fluid supply pump to pump the cooling fluid to the one or more fuel nozzles.

The cooling fluid control system of any preceding clause, the controller controlling the cooling fluid system to supply the cooling fluid through the one or more fuel nozzles during a high power operation of the turbine engine.

The cooling fluid control system of any preceding clause, the high power operation being during a takeoff condition or a climb condition of the turbine engine.

The cooling fluid control system of any preceding clause, the turbine engine including a combustor, and the controller determines the fuel nozzle temperature based on at least one of a combustor inlet temperature, a combustor inlet pressure, a fuel flow rate of fuel through the one or more fuel nozzles, or a fuel temperature of the fuel in the one or more fuel nozzles.

The cooling fluid control system of any preceding clause, further comprising one or more combustor inlet sensors that sense the combustor inlet pressure and the combustor inlet temperature of compressed air entering the combustor.

A method of operating a cooling fluid system for a turbine engine, the method comprising supplying cooling fluid from the cooling fluid system through one or more fuel nozzles of the turbine engine when a fuel nozzle temperature of the one or more fuel nozzles is greater than a fuel nozzle temperature threshold during at least one of a mid-level power operation or a low power operation of the turbine engine.

The method of the preceding clause, further comprising shutting off the cooling fluid to the one or more fuel nozzles when the fuel nozzle temperature is less than or equal to the fuel nozzle temperature threshold during the at least one of the mid-level power operation or the low power operation.

The method of any preceding clause, the fuel nozzle temperature threshold corresponding to the fuel nozzle temperature of the one or more fuel nozzles at which fuel in the one or more fuel nozzles begins to coke.

The method of any preceding clause, the fuel nozzle temperature threshold being in a range of 340° F. to 370° F.

The method of any preceding clause, the mid-level power operation being during a cruise condition of the turbine engine, and the low power operation is during a descent condition or an approach condition of the turbine engine.

The method of any preceding clause, further comprising pumping, with a cooling fluid supply pump, the cooling fluid to the one or more fuel nozzles.

The method of any preceding clause, further comprising supplying the cooling fluid through the one or more fuel nozzles during a high power operation of the turbine engine.

The method of any preceding clause, the high power operation being during a takeoff condition or a climb condition of the turbine engine.

The method of any preceding clause, the turbine engine including a combustor, and the method further comprises determining the fuel nozzle temperature based on at least one of a combustor inlet temperature, a combustor inlet pressure, a fuel flow rate of fuel through the one or more fuel nozzles, or a fuel temperature of the fuel in the one or more fuel nozzles.

The method of any preceding clause, further comprising sensing, with one or more combustor inlet sensors, the combustor inlet pressure and the combustor inlet temperature of compressed air entering the combustor.

The method of any preceding clause, the cooling fluid being at least one of water or steam.

The method of any preceding clause, the low power operation being less than 30% of a sea level static maximum engine rated thrust of the turbine engine.

The method of any preceding clause, the mid-level power operation being 30% to 85% of the sea level static maximum engine rated thrust of the turbine engine.

The method of any preceding clause, the high power operation being greater than 85% of the sea level static maximum engine rated thrust of the turbine engine.

The method of any preceding clause, further comprising sensing, with an ambient air temperature sensor, the ambient air temperature of air surrounding the turbine engine.

The method of any preceding clause, further comprising supplying fuel to the one or more fuel nozzles.

The method of any preceding clause, further comprising condensing the cooling fluid from combustion gases of the turbine engine.

The method of any preceding clause, further comprising heating the cooling fluid to a gaseous state prior to supplying the cooling fluid to the one or more fuel nozzles.

The method of any preceding clause, further comprising determining a turbine engine power level based on one or more turbine engine power signals.

The method of any preceding clause, the one or more fuel nozzles including a fuel nozzle fuel line that receives the fuel from the fuel system.

The method of any preceding clause, further comprising supplying the fuel from the fuel system to the one or more fuel nozzles through one or more fuel supply lines.

The method of any preceding clause, further comprising receiving the cooling fluid from the cooling fluid system in a fuel nozzle cooling fluid line of the one or more fuel nozzles.

The method of any preceding clause, further comprising supplying the cooling fluid from the cooling fluid system to the one or more fuel nozzles through one or more cooling fluid supply lines.

The method of any preceding clause, further comprising directing the cooling fluid from the combustion chamber through the one or more cooling fluid drain ports and to the cooling fluid tank through a cooling fluid return line.

The method of any preceding clause, the one or more cooling fluid drain ports including one or more cooling drain port valves, and the method further comprises opening the one or more cooling fluid drain port valves to allow the cooling fluid to flow through the one or more cooling fluid drain ports.

The method of any preceding clause, further comprising closing the one or more cooling fluid drain port valves to prevent the cooling fluid from flowing through the one or more cooling fluid drain ports.

The method of any preceding clause, the turbine engine including one or more mixer assemblies in fluid communication with the one or more fuel nozzles, and the method further comprises mixing, with the one or more mixer assemblies, the fuel and compressed air during operation of the turbine engine.

The method of any preceding clause, further comprising mixing, with the one or more mixer assemblies, the cooling fluid with the fuel and the compressed air.

The method of any preceding clause, the turbine engine including a fuel nozzle assembly that includes a fuel nozzle of the one or more fuel nozzles.

The method of any preceding clause, the fuel nozzle assembly including the one or more mixer assemblies.

The method of any preceding clause, the fuel nozzle including a fuel nozzle fuel line that is in fluid communication with the one or more fuel supply lines for receiving the fuel therein.

The method of any preceding clause, the fuel nozzle fuel line including one or more fuel nozzle fuel circuit lines including a primary fuel circuit line and a secondary fuel circuit line.

The method of any preceding clause, the fuel nozzle including a fuel outlet, and the method further comprises injecting the fuel out of the fuel nozzle through the fuel outlet.

The method of any preceding clause, the fuel nozzle including a fuel nozzle cooling fluid line that is in fluid communication with the cooling fluid system for receiving the cooling fluid therein.

The method of any preceding clause, the fuel nozzle cooling fluid line being in fluid communication with the one or more cooling fluid supply lines.

The method of any preceding clause, the fuel nozzle cooling fluid line being concentric with one or more fuel nozzle fuel circuit lines.

The method of any preceding clause, the secondary fuel circuit line being disposed radially outward of the primary fuel circuit line.

The method of any preceding clause, the fuel nozzle cooling fluid line being disposed radially outward of the secondary fuel circuit line.

The method of any preceding clause, further comprising swirling the compressed air with an air swirler to mix the compressed air with the fuel.

The method of any preceding clause, further comprising directing the fuel into the primary fuel circuit line during low power conditions, mid-level power conditions, and during high power conditions.

The method of any preceding clause, further comprising directing the fuel into the secondary fuel circuit line only during mid-level conditions or high power conditions to provide additional fuel during such conditions.

The method of any preceding clause, the fuel nozzle including one or more fuel nozzle lines that are in fluid communication with the one or more fuel supply lines.

The method of any preceding clause, the one or more fuel nozzle lines including a first fuel nozzle fuel line and a second fuel nozzle fuel line.

The method of any preceding clause, the first fuel nozzle fuel line being in fluid communication with a first fuel supply line of the one or more fuel supply lines.

The method of any preceding clause, the second fuel nozzle fuel line being in fluid communication with a second fuel supply line of the one or more fuel supply lines.

The method of any preceding clause, the first fuel nozzle fuel line including one or more fuel nozzle fuel circuit lines that include a primary pilot fuel circuit line and a main fuel circuit line.

The method of any preceding clause, the second fuel nozzle fuel line being a secondary pilot fuel circuit line.

The method of any preceding clause, the fuel nozzle including one or more first fuel nozzle outlets and one or more second fuel nozzle outlets.

The method of any preceding clause, the one or more first fuel nozzle outlets being oriented to inject the fuel generally axially from the fuel nozzle.

The method of any preceding clause, the one or more second fuel nozzle outlets being oriented to inject the fuel generally radially from the fuel nozzle.

The method of any preceding clause, the fuel nozzle cooling fluid line being concentric with the primary pilot fuel circuit line, the main fuel circuit line, and the secondary pilot fuel circuit line.

The method of any preceding clause, the main fuel circuit line being disposed radially outward of the primary pilot fuel circuit line.

The method of any preceding clause, the secondary pilot fuel circuit line being disposed radially outward of the main fuel circuit line.

The method of any preceding clause, the fuel nozzle cooling fluid line being disposed radially outward of the secondary pilot fuel circuit line.

The method of any preceding clause, the fuel nozzle cooling fluid line being in thermal communication with the one or more fuel nozzle fuel circuit lines.

The method of any preceding clause, the mixer assembly being a twin annular premixing swirler (TAPS) that includes a pilot mixer and a main mixer.

The method of any preceding clause, the main mixer being concentrically aligned with the pilot mixer.

The method of any preceding clause, the pilot mixer including a first mixer assembly fuel passage in fluid communication with the primary pilot fuel circuit line and the secondary pilot fuel circuit line.

The method of any preceding clause, the main mixer including a second mixer assembly fuel passage in fluid communication with the main fuel circuit line.

The method of any preceding clause, the mixer assembly including a mixer assembly heat shield that protects the mixer assembly from the combustion gases in the combustion chamber.

The method of any preceding clause, further comprising injecting the cooling fluid onto the mixer assembly heat shield.

The method of any preceding clause, the fuel nozzle temperature threshold being 350° F.

The method of any preceding clause, the ambient air temperature threshold being 35° F.

The cooling fluid control system of any preceding clause, the cooling fluid being at least one of water or steam.

The cooling fluid control system of any preceding clause, the low power operation being less than 30% of a sea level static maximum engine rated thrust of the turbine engine.

The cooling fluid control system of any preceding clause, the mid-level power operation being 30% to 85% of the sea level static maximum engine rated thrust of the turbine engine.

The cooling fluid control system of any preceding clause, the high power operation being greater than 85% of the sea level static maximum engine rated thrust of the turbine engine.

The cooling fluid control system of any preceding clause, further comprising an ambient air temperature sensor that senses the ambient air temperature of air surrounding the turbine engine.

The cooling fluid control system of any preceding clause, the turbine engine including a fuel system that supplies a fuel to the one or more fuel nozzles.

The cooling fluid control system of any preceding clause, the cooling fluid system including a condenser that condenses the cooling fluid from combustion gases of the turbine engine.

The cooling fluid control system of any preceding clause, the cooling fluid heating the cooling fluid to a gaseous state prior to supplying the cooling fluid to the one or more fuel nozzles.

The cooling fluid control system of any preceding clause, the controller determining a turbine engine power level based on one or more turbine engine power signals.

The cooling fluid control system of any preceding clause, the one or more fuel nozzles including a fuel nozzle fuel line that receives the fuel from the fuel system.

The cooling fluid control system of any preceding clause, the fuel system including one or more fuel supply lines in fluid communication with the one or more fuel nozzles for supplying the fuel from the fuel system to the one or more fuel nozzles.

The cooling fluid control system of any preceding clause, the one or more fuel nozzles including a fuel nozzle cooling fluid line that receives the cooling fluid from the cooling fluid system.

The cooling fluid control system of any preceding clause, the cooling fluid system including one or more cooling fluid supply lines in fluid communication with the one or more fuel nozzles for supplying the cooling fluid from the cooling fluid system to the one or more fuel nozzles.

The cooling fluid control system of any preceding clause, the cooling fluid system including a cooling fluid return line in fluid communication with the one or more cooling fluid drain ports and the cooling fluid tank, the cooling fluid return line directing the cooling fluid from the combustion chamber through the one or more cooling fluid drain ports and to the cooling fluid tank.

The cooling fluid control system of any preceding clause, the one or more cooling fluid drain ports including one or more cooling drain port valves, and the controller controls the one or more cooling fluid drain port valves to open to allow the cooling fluid to flow through the one or more cooling fluid drain ports.

The cooling fluid control system of any preceding clause, the controller controlling the one or more cooling fluid drain port valves to close to prevent the cooling fluid from flowing through the one or more cooling fluid drain ports.

The cooling fluid control system of any preceding clause, the turbine engine including one or more mixer assemblies in fluid communication with the one or more fuel nozzles, the one or more mixer assemblies mixing the fuel and compressed air during operation of the turbine engine.

The cooling fluid control system of any preceding clause, the one or more mixer assemblies mixing the cooling fluid with the fuel and the compressed air.

The cooling fluid control system of any preceding clause, further comprising a fuel nozzle assembly that includes a fuel nozzle of the one or more fuel nozzles.

The cooling fluid control system of any preceding clause, the fuel nozzle assembly including the one or more mixer assemblies.

The cooling fluid control system of any preceding clause, the fuel nozzle including a fuel nozzle fuel line that is in fluid communication with the one or more fuel supply lines for receiving the fuel therein.

The cooling fluid control system of any preceding clause, the fuel nozzle fuel line including one or more fuel nozzle fuel circuit lines including a primary fuel circuit line and a secondary fuel circuit line.

The cooling fluid control system of any preceding clause, the fuel nozzle including a fuel outlet, the fuel nozzle injecting the fuel out of the fuel nozzle through the fuel outlet.

The cooling fluid control system of any preceding clause, the fuel nozzle including a fuel nozzle cooling fluid line that is in fluid communication with the cooling fluid system for receiving the cooling fluid therein.

The cooling fluid control system of any preceding clause, the fuel nozzle cooling fluid line is in fluid communication with the one or more cooling fluid supply lines.

The cooling fluid control system of any preceding clause, the fuel nozzle cooling fluid line being concentric with one or more fuel nozzle fuel circuit lines.

The cooling fluid control system of any preceding clause, the secondary fuel circuit line being disposed radially outward of the primary fuel circuit line.

The cooling fluid control system of any preceding clause, the fuel nozzle cooling fluid line being disposed radially outward of the secondary fuel circuit line.

The cooling fluid control system of any preceding clause, the one or more mixer assemblies including an air swirler that swirls the compressed air to mix the compressed air with the fuel.

The cooling fluid control system of any preceding clause, the fuel nozzle fuel line directing the fuel into the primary fuel circuit line during low power conditions, mid-level power conditions, and during high power conditions.

The cooling fluid control system of any preceding clause, the fuel nozzle fuel line directing the fuel into the secondary fuel circuit line only during mid-level conditions or high power conditions to provide additional fuel during such conditions.

The cooling fluid control system of any preceding clause, the fuel nozzle including one or more fuel nozzle lines that are in fluid communication with the one or more fuel supply lines.

The cooling fluid control system of any preceding clause, the one or more fuel nozzle lines including a first fuel nozzle fuel line and a second fuel nozzle fuel line.

The cooling fluid control system of any preceding clause, the first fuel nozzle fuel line being in fluid communication with a first fuel supply line of the one or more fuel supply lines.

The cooling fluid control system of any preceding clause, the second fuel nozzle fuel line being in fluid communication with a second fuel supply line of the one or more fuel supply lines.

The cooling fluid control system of any preceding clause, the first fuel nozzle fuel line including one or more fuel nozzle fuel circuit lines that include a primary pilot fuel circuit line and a main fuel circuit line.

The cooling fluid control system of any preceding clause, the second fuel nozzle fuel line being a secondary pilot fuel circuit line.

The cooling fluid control system of any preceding clause, the fuel nozzle including one or more first fuel nozzle outlets and one or more second fuel nozzle outlets.

The cooling fluid control system of any preceding clause, the one or more first fuel nozzle outlets being oriented to inject the fuel generally axially from the fuel nozzle.

The cooling fluid control system of any preceding clause, the one or more second fuel nozzle outlets being oriented to inject the fuel generally radially from the fuel nozzle.

The cooling fluid control system of any preceding clause, the fuel nozzle cooling fluid line being concentric with the primary pilot fuel circuit line, the main fuel circuit line, and the secondary pilot fuel circuit line.

The cooling fluid control system of any preceding clause, the main fuel circuit line being disposed radially outward of the primary pilot fuel circuit line.

The cooling fluid control system of any preceding clause, the secondary pilot fuel circuit line being disposed radially outward of the main fuel circuit line.

The cooling fluid control system of any preceding clause, the fuel nozzle cooling fluid line being disposed radially outward of the secondary pilot fuel circuit line.

The cooling fluid control system of any preceding clause, the fuel nozzle cooling fluid line being in thermal communication with the one or more fuel nozzle fuel circuit lines.

The cooling fluid control system of any preceding clause, the mixer assembly being a twin annular premixing swirler (TAPS) that includes a pilot mixer and a main mixer.

The cooling fluid control system of any preceding clause, the main mixer being concentrically aligned with the pilot mixer.

The cooling fluid control system of any preceding clause, the pilot mixer including a first mixer assembly fuel passage in fluid communication with the primary pilot fuel circuit line and the secondary pilot fuel circuit line.

The cooling fluid control system of any preceding clause, the main mixer including a second mixer assembly fuel passage in fluid communication with the main fuel circuit line.

The cooling fluid control system of any preceding clause, the mixer assembly including a mixer assembly heat shield that protects the mixer assembly from the combustion gases in the combustion chamber.

The cooling fluid control system of any preceding clause, the fuel nozzle cooling fluid line injecting the cooling fluid onto the mixer assembly heat shield.

The cooling fluid control system of any preceding clause, the fuel nozzle temperature threshold being 350° F.

The cooling fluid control system of any preceding clause, the ambient air temperature threshold being 35° F.

A turbine engine comprising one or more fuel nozzles and the cooling fluid control system of any preceding clause.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A method of operating a cooling fluid system for a turbine engine, the method comprising:
   shutting down the turbine engine;
   determining that an ambient air temperature about the turbine engine is greater than an ambient air temperature threshold; and
   supplying cooling fluid from the cooling fluid system through one or more fuel nozzles of the turbine engine in response to both shutting down the turbine engine and determining that the ambient air temperature about the turbine engine is greater than the ambient air temperature threshold.

2. The method of claim 1, further comprising pumping, with a cooling fluid supply pump, the cooling fluid to the one or more fuel nozzles when the turbine engine is shut down.

3. The method of claim 1, further comprising shutting off the cooling fluid to the one or more fuel nozzles when the ambient air temperature is less than or equal to the ambient air temperature threshold.

4. The method of claim 1, wherein the ambient air temperature threshold is in a range of 32° F. to 35° F.

5. The method of claim 1, wherein the turbine engine includes a combustor having a combustion chamber, and the method further comprises injecting the cooling fluid from the one or more fuel nozzles into the combustion chamber when the turbine engine is shut down and the cooling fluid is supplied from the cooling fluid system through the one or more fuel nozzles.

6. The method of claim 5, wherein the combustion chamber is defined by an outer liner and an inner liner, the cooling fluid system includes one or more cooling fluid drain ports disposed through at least one of the outer liner or the inner liner, and the method further comprising draining the cooling fluid in the combustion chamber through the one or more cooling fluid drain ports when the turbine engine is shut down and the cooling fluid is supplied from the cooling fluid system through the one or more fuel nozzles.

7. The method of claim 6, wherein the cooling fluid system includes a cooling fluid tank, and the method further comprises returning the cooling fluid from the combustion chamber to the cooling fluid tank to store the cooling fluid therein when the turbine engine is shut down and the cooling fluid is supplied from the cooling fluid system through the one or more fuel nozzles.

8. The method of claim 7, further comprising pumping, with a cooling fluid return pump, the cooling fluid from the combustion chamber to the cooling fluid tank.

9. The method of claim 7, wherein supplying cooling fluid from the cooling fluid system through the one or more fuel nozzles when the turbine engine is shut down comprises supplying the cooling fluid from the cooling fluid tank to the one or more fuel nozzles when the turbine engine is shut down.

10. A cooling fluid control system for a turbine engine, the cooling fluid control system comprising:
    one or more fuel nozzles a cooling fluid system in fluid communication with the one or more fuel nozzles for supplying a cooling fluid to the one or more fuel nozzles; and
    a controller configured to control the cooling fluid system to supply the cooling fluid through the one or more fuel nozzles when the turbine engine is shut down and an ambient air temperature about the turbine engine is greater than an ambient air temperature threshold.

11. The cooling fluid control system of claim 10, further comprising a cooling fluid supply pump, wherein the controller controls the cooling fluid supply pump to pump the cooling fluid to the one or more fuel nozzles.

12. The cooling fluid control system of claim 10, wherein the controller controls the cooling fluid system to shut off the cooling fluid to the one or more fuel nozzles when the ambient air temperature is less than or equal to the ambient air temperature threshold.

13. The cooling fluid control system of claim 10, wherein the ambient air temperature threshold is in a range of 32° F. to 35° F.

14. The cooling fluid control system of claim 10, further comprising a combustor having a combustion chamber, and the controller controls the cooling fluid system to inject the cooling fluid from the one or more fuel nozzles into the combustion chamber.

15. The cooling fluid control system of claim 14, wherein the combustion chamber is defined by an outer liner and an inner liner, the cooling fluid system includes one or more cooling fluid drain ports disposed through at least one of the outer liner or the inner liner, and the controller controls the cooling fluid system to drain the cooling fluid in the combustion chamber through the one or more cooling fluid drain ports.

16. The cooling fluid control system of claim 15, wherein the cooling fluid system includes a cooling fluid tank, and the controller controls the cooling fluid system to return the cooling fluid from the combustion chamber to the cooling fluid tank to store the cooling fluid therein.

17. The cooling fluid control system of claim 16, wherein the cooling fluid system includes a cooling fluid return pump, and the controller controls the cooling fluid return pump to pump the cooling fluid from the combustion chamber to the cooling fluid tank.

18. The cooling fluid control system of claim 16, wherein the controller controls the cooling fluid system to supply the cooling fluid from the cooling fluid tank to the one or more fuel nozzles.

19. A cooling fluid control system for a turbine engine, the cooling fluid control system comprising:

one or more fuel nozzles;

a combustor having a combustion chamber defined by an outer liner and an inner liner, the one or more fuel nozzles in fluid communication with the combustion chamber;

one or more cooling fluid drain ports disposed through at least one of the outer liner or the inner liner;

a cooling fluid system in fluid communication with the one or more fuel nozzles for supplying a cooling fluid to the one or more fuel nozzles; and a controller configured to control the cooling fluid system to:

supply the cooling fluid through the one or more fuel nozzles when the turbine engine is shut down;

inject the cooling fluid from the one or more fuel nozzles into the combustion chamber; and drain the cooling fluid in the combustion chamber through the one or more cooling fluid drain ports.

20. The cooling fluid control system of claim 19, wherein the cooling fluid system includes a cooling fluid tank, and the controller controls the cooling fluid system to return the cooling fluid from the combustion chamber to the cooling fluid tank to store the cooling fluid therein.

* * * * *